(12) United States Patent
Sinojima et al.

(10) Patent No.: US 7,601,088 B2
(45) Date of Patent: Oct. 13, 2009

(54) CONTINUOUSLY VARIABLE TRANSMISSION

(75) Inventors: Takumi Sinojima, Kanagawa (JP); Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 261 days.

(21) Appl. No.: 11/753,727

(22) Filed: May 25, 2007

(65) Prior Publication Data

US 2007/0275810 A1 Nov. 29, 2007

(30) Foreign Application Priority Data

May 26, 2006 (JP) .............................. 2006-146155

(51) Int. Cl.
F16H 61/664 (2006.01)
(52) U.S. Cl. ..................................... 475/216
(58) Field of Classification Search ................ 475/214, 475/215, 216; 477/41, 42, 70, 79, 908; 476/39
See application file for complete search history.

(56) References Cited

U.S. PATENT DOCUMENTS

| | | | | |
|---|---|---|---|---|
| 2005/0037887 A1* | 2/2005 | Shinojima et al. | ............ | 475/214 |
| 2005/0202930 A1* | 9/2005 | Imanishi et al. | ............... | 477/39 |
| 2006/0063632 A1* | 3/2006 | Hiraku et al. | ............... | 475/214 |

FOREIGN PATENT DOCUMENTS

| | | |
|---|---|---|
| JP | 5-39850 A | 2/1993 |
| JP | 9-210191 A | 8/1997 |
| JP | 2734583 | 1/1998 |
| JP | 10-196759 A | 7/1998 |
| JP | 11-108147 A | 4/1999 |
| JP | 2000-220719 A | 8/2000 |
| JP | 2002-139140 A | 5/2002 |
| JP | 2002-276789 A | 9/2002 |
| JP | 2003-194207 A | 7/2003 |
| JP | 2003-207042 A | 7/2003 |
| JP | 2003-307266 A | 10/2003 |
| JP | 2004-116576 A | 4/2004 |
| JP | 2004-211836 A | 7/2004 |
| JP | 2004-225888 A | 8/2004 |

OTHER PUBLICATIONS

Supplement Volume to Red Badge Series 245/A Book Teaches Latest Mechanisms of Motor Vehicles, pp. 92-93, Motoo Aoyama, published by Sansuisha Co., Ltd.,/Kodansha Co., Ltd., Dec. 20, 2001.
Toroidal CVT, Hirohisa Tanaka, published by Corona-sha Co., Ltd., Jul. 13, 2000.

* cited by examiner

*Primary Examiner*—Sherry L Estremsky
*Assistant Examiner*—Edwin A Young
(74) *Attorney, Agent, or Firm*—Sughrue Mion, PLLC

(57) ABSTRACT

A control unit is imparted a function in which the engagement of a high-speed clutch which had been in disengagement until then is started (or the energization of a high-speed clutch solenoid switch valve is put to ON) before a change-speed of a toroidal continuously variable transmission has reached an optimal value for performance of a mode switch (a point A, for example, 0.46 in a speed increasing ratio) or at a point B (for example, 0.6 in the speed increasing ratio). As a result of this, the problem can be solved.

12 Claims, 12 Drawing Sheets

CONTINUOUSLY VARIABLE TRANSMISSION

BACKGROUND OF THE INVENTION

1. Field of the Invention

The present invention relates to an improvement on a continuously variable transmission which incorporates therein a toroidal continuously variable transmission for use as an automatic transmission for, for example, a vehicle (a motor vehicle), which realizes at low cost a construction which enables a quick and smooth mode switching between a low-speed mode and a high-speed mode.

2. Description of Related Art

The application of a toroidal continuously variable transmission to an automotive transmission is known as it is described in many publications such as Japanese Patent Examined Publication JP-B-2734583, Japanese Patent Unexamined Publication JP-A-5-39850, "supplement volume to Red Badge Series 245/A Book Teaches Latest Mechanisms of Motor Vehicles" pages 92 to 93 written by Motoo Aoyama and published by Sansuisha Co., Ltd./Kodansha Co., Ltd. on Dec. 20, 2001, and "Toroidal CVT" written by Hlirohisa Tanaka and published by Corona-sha Co., Ltd. on Jul. 13, 2000. Further, the application of the toroidal continuously variable transmission to the automotive transmission has already been implemented in some areas. In addition, a continuously variable transmission in which a toroidal continuously variable transmission is combined with a planetary gear transmission unit has also been known widely through publication in, for example, Japanese Patent Unexamined Publications JP-A-10-196759, JP-A-2003-307266, JP-A-2000-220719 JP-A-2004-225888 and JP-A-2004-211836. Among these documents, JP-A-10-196759 describes a continuously variable transmission including a mode (a low-speed mode) in which power is transmitted only by a toroidal continuously variable transmission and a mode (a high-speed mode) which realizes a so-called power split state in which main power is transmitted by a planetary gear transmission unit, which is a differential mechanism, while transmission ratios are regulated by the toroidal continuously variable transmission. In addition, the JP-A-2003-307266, JP-A-2000-220719, JP-A-2004-225888 and JP-A-2004-211836 describe continuously variable transmissions which include a mode (a low-speed mode) which can realize a so-called geared neutral state in which the rotational state of an output shaft can be switched between forward and reverse rotations across a halt state interposed therebetween while an input shaft is kept rotating in one direction.

FIGS. 9 to 10 show a continuously variable transmission described in the JP-A-2004-225888 and JP-A-2004-211836 which includes the mode which can realize the geared neutral state, in which FIG. 9 shows a block diagram of the continuously variable transmission and FIG. 10 shows a hydraulic pressure circuit which controls the continuously variable transmission. An output of an engine is inputted into an input shaft 2 via a damper 2. The power so transmitted to the input shaft 3 is then transmitted to a planetary gear transmission unit 5 which is a gear type differential mechanism directly or via a toroidal continuously variable transmission 4. Then, a differential component of constituent members of the planetary gear transmission unit 5 is taken out to an output shaft 9 via a clutch device 6, that is, low-speed and high-speed clutches 7, 8 shown in FIG. 10. In addition, the toroidal continuously variable transmission 4 includes input and output disks 10, 11, a plurality of power rollers 12, a plurality of trunnions (not shown) which each constitute a support member, an actuator 13 (FIG. 10), a pushing unit or loader 14, and a transmission ratio control unit 15. Among these constituent members, the input and output disks 10, 11 are disposed concentrically with each other and in such a manner as to rotate relative to each other.

Additionally, the power rollers 12 are held between inner surfaces of the input and output disks 10, 11 which face each other in such a manner as to transmit power (torque) between the input and output disks 10, 11. The trunnions rotatably support the power rollers 12, respectively. The actuator 13 is a hydraulic actuator and is adapted to displace the trunnions which support the power rollers 12, respectively, in axial directions of pivot shafts which are provided at both end portions of each of the trunnions so as to change transmission ratios between the input disk 10 and the output disk 11. In addition, the loader 14 is a hydraulic loading unit and is adapted to apply a load to the input disk 10 and the output disk 11 in a direction in which they approach each other. Additionally, the transmission ratio control unit 15 controls the displacement direction and amount of the actuator 13 so as to obtain a desired transmission ratio value between the input disk 10 and the output disk 11.

In the case of the illustrated example, the transmission ratio control unit 15 is made up of a control unit 16, a stepping motor 17 which is switched based on control signals from the control unit 16, a primary solenoid vale or line pressure control solenoid switching valve 18, a load solenoid vale or simply solenoid valve 19, a shift solenoid valve 20 and a control valve unit 21 whose operating state is switched by these constituent members 17 to 20. In addition, this control valve unit 21 is a combination of a transmission ratio control valve 22, a correction cylinder or correction cylinder 23, correction control valves 24a, 24b, high-speed clutch and low-speed clutch switching valves 25, 26 (FIG. 10). Among these constituent members, the transmission ratio control valve 22 is such as to control oil pressure that is supplied to or discharged from the actuator 13. In addition, the correction cylinder 23 is such as to regulate the loading state of the transmission ratio control valve 22 in response to a torque (a passage torque) which passes through the toroidal continuously variable transmission 4 so as to correct the transmission ratio of the toroidal continuously variable transmission 4. The correction control valves 24a, 24b are such as to control oil pressures that are supplied to or discharged from the correction cylinder 23 and are adapted to be switched in response to the switching of the solenoid valve 29. Furthermore, the high-speed clutch and low-speed clutch switching valves 25, 26 are such as to switch the introduction state of pressure oil to the high-speed clutch and low speed clutch 8, 7, respectively.

In addition, pressure oils taken out from oil pumps 27 (27a, 27b in FIG. 10), which are driven by power taken out from the region of the damper 2, are sent out into the control valve unit 21 and the loader 14. Namely, pressure oil sucked in from an oil reservoir 28 (FIG. 10) and discharged from the oil pumps 27a, 27b is regulated to become a predetermined pressure by a loader pressure regulator valve 29 and a low pressure side or secondary regulator valve 30 (FIG. 10). Of these valves, the loader pressure regulator valve 29 is regulated with respect to its valve opening pressure in response to introduction of an oil pressure based on a difference in pressure (a differential pressure) between a pair of hydraulic chambers 35a, 35b which are provided in the actuator 13 in such a manner as to face each other across a piston and an oil pressure based on the opening or closing of the line pressure control solenoid switching valve 18. Then, a pushing force or load generated by the loader 14 is restricted to an optimal value according to an operating condition of the vehicle based on the regulation of valve opening pressure in that way.

Additionally, the oil pressure that has been regulated by the loader pressure regulator valve 29 in that way is sent not only into the actuator 13 via the transmission ratio control valve 22 but also into an interior of a hydraulic chamber of the low-speed clutch 7 or high-speed clutch 8 via a manual oil pressure switching valve 31, a pressure reducing valve 32 and the low-speed clutch switching valve 26 or high-speed clutch switching valve 25. Of these low-speed clutch 7 and the high-speed clutch 8, the low-speed clutch 7 is engaged when realizing a low-speed mode for increasing a speed reducing ratio (including an infinite transmission ratio (geared neutral state=GN state)) and is disengaged when realizing a high-speed mode for reducing the speed reducing ratio. On the contrary, the high-speed clutch 8 is disengaged when realizing the low-speed mode and is engaged when realizing the high-speed mode. In addition, the supply and discharge of pressure oil to and from the low-speed and high-speed clutches 7, 8 is switched in response to the switching of the shift solenoid valve 20.

FIG. 11 depicts an example of relationship between a transmission ratio (a speed increasing ratio) of the toroidal continuously variable transmission 4 and a speed ratio (a speed increasing ratio) of the whole continuously variable transmission. For example, in the low-speed mode in which the low-speed clutch 7 is engaged, while the high-speed clutch 8 is disengaged, as is indicated by a solid line a, as the transmission ratio of the toroidal continuously variable transmission 4 is reduced from a value which can realize the GN state (a GN value), the speed ratio of the whole continuously variable transmission is made to be increased in a forward direction (+: a forward rotating direction) from a halt state (a state where the speed ratio is 0). In addition, as the transmission ratio of the toroidal continuously variable transmission 4 is increased from the GN value, the speed ratio of the whole continuously variable transmission is made to be increased in a reverse direction (−: a backward rotating direction) from the halt state. On the other hand, in the high-speed mode in which the high-speed clutch 8 is engaged, while the low-speed clutch 7 is disengaged, as is indicated by a solid line β, as the transmission ratio of the toroidal continuously variable transmission 4 is increased, the speed ratio of the whole continuously variable transmission is increased (in the forward direction).

In a vehicle which incorporates therein a continuously variable transmission like the one described above, an optimal speed ratio (a target speed ratio) of the continuously variable transmission is obtained by the control unit 16 based on a running state (an operating condition) of the vehicle at a certain point in time which is obtained from a manipulation of an accelerator pedal (a throttle position) or a running speed (a vehicle speed). Then, in order to realize this target speed ratio, the stepping motor 17 is driven based on a control signal from the control unit 16 so as to switch the transmission ratio control valve 22, so that the transmission ratio of the toroidal continuously variable transmission 4 is regulated to a target transmission ratio which corresponds to the target speed ratio. Additionally, in conjunction with this, the shift solenoid valve 20 is switched as is required (according to the target speed ratio of the continuously variable transmission) to thereby switch the engagement or disengagement state of the low-speed and high-speed clutches 7, 8, so as to select a required running mode (the low-speed mode or the high-speed mode), whereby the speed ratio of the continuously variable transmission is regulated to the optimal value (the target speed ratio) according to the running state then.

Incidentally, in the case of the continuously variable transmission which is made up of the toroidal continuously variable transmission and the planetary gear transmission unit which are combined together via the clutch device and which has the low-speed mode and the high-speed mode, whether it can realize the geared neutral state or the power split state as is described in the JP-A-10-196759, the mode switch between the low-speed mode and the high-speed mode will be performed in the following manner. Namely, this mode switch is performed in a state where the speed ratio of the continuously variable transmission that is regulated according to a running state at a certain point in time (or a target speed ratio which corresponds thereto) is regulated to a value which can be realized in both the low-speed mode and the high-speed mode (a value (of the order of 0.3 in a speed increasing ratio) which corresponds to an intersection point B between the solid line α denoting the low-speed mode and the solid line β denoting the high-speed mode in FIG. 11). As this occurs, when standing on the viewpoint from the toroidal continuously variable transmission 4, the mode switch is performed in a such a state that the transmission ratio of the toroidal continuously variable transmission 4 that is regulated according to a running state at a certain point in time (or a target speed ratio which corresponds thereto) is regulated to a mode switching point (a rotation synchronizing point, which is on the order of 0.4 in the speed increasing ratio (a maximum reduction state)) which is a value corresponding to the intersection point B.

For example, in the case of the vehicle running in the low-speed mode, when the transmission ratio of the toroidal continuously variable transmission 4 is reduced (the speed ratio of the continuously variable transmission is increased) according to a running state of the vehicle then to reach the mode switching point (for example, 0.4 in the speed increasing ratio), the shift solenoid valve 20 is switched based on a control signal of the control unit 16. Then, the high-speed clutch 8, which had been in disengagement until then, is engaged, while the low-speed clutch 7, which had been in engagement until then, is disengaged, whereby the running mode is switched from the low-speed mode to the high-speed mode. On the contrary, in the case of the vehicle running in the high-speed mode, when the transmission ratio of the toroidal continuously variable transmission 4 is reduced (the speed ratio of the continuously variable transmission is reduced) according to a running state of the vehicle then to reach the mode switching point, the shift solenoid valve 20 is switched based on a control signal of the control unit 16. Then, the low-speed clutch 7, which had been in disengagement until then, is engaged, while the high-speed clutch 8, which had been in engagement until then, is disengaged, whereby the running mode is switched from the high-speed mode to the low-speed mode.

When the mode switch is performed between the low-speed mode and the high-speed mode in the ways described above, it becomes important to perform the mode switch in a smooth fashion with a view to securing a good riding performance (riding comfort). As a technique for realizing such a smooth mode switch, for example, Japanese Patent Unexamined Publications JP-A-2002-139140 and JP-A-2002-276789 describe a technique in which in a continuously variable transmission which incorporates therein a toroidal continuously variable transmission (or a belt-type continuously variable transmission unit), a mode switch (reversal in a passage torque) is performed in such a state that the transmission ratio of the toroidal continuously variable transmission is held (fixed) to a predetermined value (in such a state that a change in speed is prohibited) so as to reduce a shock that is generated when the mode switch is performed. In addition, Japanese. Patent Unexamined Publication JP-A-11-108147 describes a technique in which a mode switch is performed in such a state that a rotational speed of a power that is inputted in to a planetary gear transmission unit by way of a toroidal continuously variable transmission coincides with a rotational speed of a power that is inputted into the planetary gear transmission unit without passing through the toroidal continuously variable transmission so as to enable the engagement of a clutch in a smooth fashion when the mode switch is performed. Additionally, JP-A-9-210191 describes a technique in which when a mode switch is performed, both of clutches one of which has been in engagement and the other in disengagement are brought into engagement simultaneously, whereafter the clutch that had been in engagement until then is disengaged so as to perform smoothly the engagement and disengagement of the clutches.

Then, Japanese Patent Unexamined Publication JP-A-2003-207042 describes a technique in which a timing when a low-speed clutch is disengaged when a running mode is switched from a low-speed mode to a high-speed mode is made to differ from a timing when a high-speed clutch is disengaged when the running mode is switched from the high-speed mode to the low-speed mode In addition, Japanese Patent Unexamined Publication JP-A-2003-194207 describes a technique in which the transmission ratio of a toroidal continuously variable transmission is corrected (regulated) in the midst of a mode switch to thereby reduce a gear change shock based on a torque shift. Additionally, Japanese Patent Unexamined Publication JP-A-2004-116576 describes a technique in which a gear change shock based on a torque shift which occurs when a mode switch (engagement and disengagement of clutches) is performed is reduced by regulating a timing to perform the mode switch in expectation of the torque shift.

Incidentally, as has been described before, the mode switch is preferably performed in such a state that the transmission ratio of the toroidal continuously variable transmission that is regulated according to the running state (or the target transmission ration which corresponds thereto) of the vehicle then is regulated to the mode switching point (the rotation synchronizing point). Because of this, according to the technique described in, for example, Patent Document No. 10, the regulation of the transmission ratio of the toroidal continuously variable transmission to the mode switching point is determined by a substantial coincidence of the rotational speeds of a fastening member and a fastened member of a clutch (a low-speed clutch or a high-speed clutch) that had been in disengagement until then. Then, it being determined from the substantial coincidence of the rotational speeds of the fastening member and the fastened member that the transmission ratio of the toroidal continuously variable transmission, the clutch, which had been in disengagement until then, is started to be engaged, while a clutch which had been in engagement until then is disengaged.

However, in the case that the clutch which had been in disengagement until then is started to be engaged on condition that the transmission ratio of the toroidal continuously variable transmission has reached the mode switching point in the way described above, the time period that is taken to perform the mode switch becomes long. Namely, when the modes are switched, the low-speed and high-speed clutches which make up the clutch device take a certain time period (cause a delay in responding to oil pressure) from the start to the end of engagement thereof in accordance with conditions at the time of switching such as oil temperature and temperature characteristics of friction materials which make up each of the clutches and furthermore based on an unavoidable delay in mechanical response. On the other hand, when the modes are switched, a change-speed control according to the mode which results after the intended mode switch is completed cannot be started before the engagement of the clutch which had been in disengagement until then is completed. Because of this, in the event that the engagement of the clutch which had been in disengagement until then is started on condition that the transmission ratio of the toroidal continuously variable transmission has reached the mode switching point, there occurs a case where the transmission ratio of the toroidal continuously variable transmission is held at the mode switching point for at least a time period from the start to the end of engagement thereof.

The longer the time period during which the transmission ratio of the toroidal continuously variable transmission is held unchanged in the way described above, in other words, the time period during which there occurs no change in speed of the toroidal continuously variable transmission becomes, the longer the time period which is taken before the change-speed control based on the mode resulting after the intended mode switch is completed becomes, and a time period which is substantially required for the mode switch is extended (the start of the change-speed control based on the mode resulting after the intended mode switch is completed is delayed). Then, when the time period required for the mode switch is extended, there might be caused a possibility that an acceleration intended by the driver cannot be obtained sufficiently (or the acceleration performance is reduced) when the vehicle is attempted to be started drastically from rest (or accelerated drastically), for example, by largely depressing the accelerator pedal (by increasing the throttle position) or when the vehicle is attempted to accelerated drastically based on a kickdown operation during the running of the vehicle, which is not preferable.

SUMMARY OF THE INVENTION

The invention was made in view of the situations described above and an object thereof is to realize a construction which can perform quickly and smoothly a mode switch between a low-speed mode and a high-speed mode at low cost without making a continuously variable transmission complex in construction.

According to an aspect of the invention, there is provided a continuously variable transmission comprising:
  a toroidal continuously variable mission;
  a planetary gear transmission; and
  a clutch device comprising;
    a low-speed clutch that is engaged to realize a low-speed mode in which a reduction ratio is increased and is disengaged to realize a high-speed mode in which the reduction ratio is decreased;
    a high-speed clutch that is engaged to realize the high-speed mode and is disengaged to realize the low-speed mode; and
    a control unit that switches an engagement/disengagement state of the low-speed clutch and the high-speed clutch so as to realize either of the low-speed mode and the high-speed mode,
  wherein when the mode of the clutch device are switched between the low-speed mode and the high-speed mode, in order to ensure a time period during which both the clutches are kept in engagement concurrently, after one of the low-speed and high-speed clutches which had been in disengagement until then is engaged, the control unit disengages the other of the clutches which had been in engagement until then, and the control unit estimates a time delay in response which is considered to be necessary from a beginning to an end of the engagement of the one clutch, and when switching the speed mode, based on the thus pre-obtained delay time, the control unit starts to engage the one clutch before a transmission ratio of the toroidal continuously variable transmission has reached an optimal value for switching the mode of the clutch device.

In other words, the control unit starts the engagement of the one clutch before the transmission ratio of the toroidal continuously variable transmission which is regulated according to the running state (or the target transmission ratio which corresponds thereto) of the vehicle then has reached the optimal value for switching the mode.

In addition, in the event that the engagement of the one clutch is started based on the operation of the control unit as stated above, the transmission ratio of the toroidal continuously variable transmission continues to be adjusted towards the optimal value for switching the mode without being held at the value at the start of engagement. Namely, even when the engagement of the one clutch is started, the transmission ratio of the toroidal continuously variable transmission is adjusted according to the running state (or the target transmission ratio which corresponds thereto) of the vehicle then. Consequently, in case the running state at that time is such as to result in the mode switch, as has been described above, the transmission ratio of the toroidal continuously variable transmission changes toward the optimal value for switching the mode.

In addition, the optimal value for switching the mode can be made to be a mode switching point which is determined by design (a rotation synchronizing point, for example, a maximum reduction state (for example, 0.46 in the speed increasing ratio) Additionally, the optimal value can also be made to deviate from the mode switching point (or can be made to be a value lying in the vicinity of the mode switching point (for example, around 0.46 in the speed increasing ratio)) as required. For example, the optimal value can be made to be a value which is determined by taking into consideration a variation in transmission ratio (a torque shift) that would occur based on a change in a torque (a passage torque) which passes through the toroidal continuously variable transmission which occurs from the engagement of the one clutch to the disengagement of the other clutch (a value smaller or larger than the mode switching point by a magnitude corresponding to the torque shift). Whether the optimal value be made smaller or larger depends on the direction of the passage torque, the direction of the mode switch (the low-speed mode to the high-speed mode or the high-speed mode to the low-speed mode) then, and the like. In addition, the value by which the optimal value is made to deviate from the mode switching point (for example, in the event that the optimal value is made to be 0.46± a in the speed increasing ratio, the magnitude of the correction value a) can be made to vary (be regulated) according to the running state of the vehicle, the magnitude of the passage torque then and the like. In short, a value which can reduce a change-speed shock generated before or after the mode switch to a minimum level irrespective of the torque shift, in other words, a value which can reduce the change-speed shock to the minimum level when a transmission ratio control according to the mode resulting after the mode switch is started can constitute the optimal value for switching the mode.

In addition, according to another aspect of the invention, the engagement of the one clutch is preferably started on condition that an estimated time period considered necessary for the transmission ratio of the toroidal continuously variable transmission to reach the optimal value for switching the mode from its current value which is obtained from the current transmission ratio and change-speed of the toroidal continuously variable transmission is determined to become equal to or less than a time delay in response of the one clutch (the reaching time≦the time delay).

To be more specific, in the low-speed mode in which the low-speed clutch is engaged and the high-speed clutch is disengaged, the engagement of the high-speed clutch is started on condition that the estimated reaching time is determined to become equal to or less than the delay time in response of the high-speed clutch.

Alternatively, in the high-speed mode in which the high-speed clutch is engaged and the low-speed clutch is disengaged, the engagement of the low-speed clutch is started on condition that the estimated reaching time is determined to become equal to or less than the delay time in response of the low-speed clutch.

In addition, according to still another aspect of the invention, the delay time in response is made to be an estimated time period considered necessary for pressure of oil that is introduced into the one clutch (the low-speed clutch or the high-speed clutch) to rise to a sufficient value to perform a power transmission from the generation (output) of a signal which signals the engagement of the one clutch from the control unit. In other words, the delay time in response is made to be an estimated time period considered necessary for a sufficient oil pressure to transmit power to be introduced into an interior of a hydraulic chamber of the one clutch from the actuation of a solenoid switch valve (a solenoid valve) for switching the supply and discharge of pressure oil to and from the one clutch based on the signal. Note that the delay time in response like this can be obtained in advance from experiments, simulations and the like for storage in a memory of the control unit. In addition to this, the delay time in response can also be regulated to an (appropriate) value according to an oil temperature (a quantity of state) then based on a quantity of state such as an oil temperature of a pressure oil that is introduced into the hydraulic chamber of each of the high-speed and low-speed clutches which affects the length of the delay time in response.

To be specific, for example, in the event that the temperature of the oil is high and the viscosity thereof is low, a resistance to the flow of pressure oil through an oil passage becomes small, and a time period from the start and end of engagement of the one clutch becomes short. Because of this, the higher the oil temperature increases, the shorter the delay time in response becomes. On the contrary, in the event that the temperature of the oil is low and the viscosity thereof is high, the resistance to the flow of pressure oil through the oil passage becomes large, and the time period from the start and end of engagement of the one clutch becomes long. Because of this, the lower the oil temperature decreases, the longer the delay time in response becomes. In any case, a relationship between oil temperatures and time delays in response which corresponds to the oil temperatures like this is obtained in advance from experiments, simulations and the like for storage in the memory of the control unit in the form of a map or calculation formulae. Then, using the map or the like so stored, a time delay in response which is appropriate to a quantity of state (oil temperature) then is obtained, so as to regulate the time (timing) when the engagement of the one clutch is started according to the delay time in response so obtained. Note that for example, the delay time in response and the quantity of state (oil temperature) can be made to be measured at all times during the operation of the vehicle so as to make the control unit to learn to obtain an optimal value then (to modify the map or the like according to values so measured).

In addition, according to still another aspect of the invention, a time (timing) to start the engagement of the one clutch is corrected according to a throttle position at that time. Namely, the time point (timing) to start the engagement of the one clutch which is obtained from a relationship between the reaching time and the delay time in response by correcting the delay time in response or the reaching time according to the throttle position then is regulated (corrected) to an optimal value which corresponds to the throttle position.

To be specific, for example, in a case where the throttle position is large in the low-speed mode, the reaching time becomes short. Because of this, with a larger throttle position, a correction is made so that the reaching time becomes short (or the delay time in response becomes long) in order to make the timing when the engagement of the high-speed clutch is started occur earlier. On the contrary, in a case where the throttle position is small, the reaching time becomes long. Because of this, with a smaller throttle position, a correction is made so that the reaching time becomes long (or the delay time in response becomes short) in order to make the timing when the engagement of the high-speed clutch is started occur later. In addition, a relationship like this between the throttle position and the appropriate reaching time or the delay time in response which corresponds to the throttle position and hence (a correction amount of) the appropriate timing when the engagement of the high-speed clutch is started can also be stored so as not only to regulate (correct) the time to start the engagement of the one clutch to the appropriate reaching time (timing) to the throttle position then but also to make the control unit learn the regulation or correction as required.

According to still another aspect of the invention, the control unit judges that both the clutches (the low-speed and high-speed clutches) are engaged concurrently based on a change in torque which passes through the toroidal continuously variable transmission. Then, the other clutch which had been in engagement until then is disengaged on condition that both the clutches are determined to be in engagement concurrently based on the above judgment.

As this occurs, whether or not both the clutches are in engagement concurrently is more preferably determined based on whether or not the torque which passes through the toroidal continuously variable transmission (the passage torque) has become 0 (a ninth aspect of the invention), whether or not the passage torque has changed by a predetermined amount towards 0 (a tenth aspect of the invention) or whether or not the passage torque has changed at a predetermined speed (or faster) towards 0 (an eleventh aspect of the invention) or based on more than one of these changes.

In addition, according to still another aspect of the invention, a mode is provided in which a geared neutral state can be realized in which an output shaft is stopped while an input shaft is being allowed to rotate in one direction As has been described heretofore, in the case of the continuously variable transmission of the invention, when the mode switch occurs, the engagement of the one clutch which had been in disengagement until then is started according to the delay time in response (the estimated time period considered necessary from the start to the end of engagement) of the one clutch before the transmission ratio of the toroidal continuously variable transmission has reached the optimal value (for example, the mode switching point (the rotation synchronizing point) or the appropriate value lying in the vicinity of the mode switching point) for performance of the mode switch. Because of this, the transmission ratio of the toroidal continuously variable transmission can be regulated to the optimal value for switching the mode immediately before the one clutch has been engaged completely. As a result, the time period from the point in time at which the transmission ratio of the toroidal continuously variable transmission has reached the optimal point for performance of the mode switch in the way described above to the point in time at which the transmission ratio control according to the mode resulting after the mode switch is started can be made short, whereby the time period during which no speed change takes place in the toroidal continuously variable transmission can be made short. In other words, irrespective of (the length of) the time period from the point in time at which the engagement of the one clutch is started to the point in time at which the other clutch is disengaged, the time period necessary for the substantial mode switch which is the time period during which no speed change takes place in the toroidal continuously variable transmission can be made short. Because of this, for example, even when the accelerator pedal is largely depressed (the throttle position is increased) to start (accelerate) the vehicle from rest drastically or to accelerate the vehicle drastically based on kickdown during the running of the vehicle, the occurrence of a risk can be avoided that an acceleration intended by the driver is not obtained (the acceleration performance is decreased).

In addition, as is described in the second aspect of the invention, by continuing to regulate the transmission ratio of the toroidal continuously variable transmission even after the engagement of the one clutch has been started, the transmission ratio of the toroidal continuously variable transmission can be regulated to the optimal value for switching the mode in such a state that the one clutch has been engaged completely (and hence both the clutches are in engagement concurrently). In particular, as is described in the third to fifth aspects of the invention, in the event that the engagement of the one clutch is started on condition that the estimated reaching time considered necessary for the transmission ratio of the toroidal continuously variable transmission to reach the optimal value for switching the mode becomes equal to or less than the estimated time delay in response considered necessary from the start to the end of engagement of the one clutch, the transmission ratio of the toroidal continuously variable transmission can be regulated to the optimal value for switching the mode immediately before the one clutch has been engaged completely. This can prevent the generation of a change-speed shock when the modes are switched, thereby enabling a smooth mode switch to be performed.

Additionally, as is described in the sixth aspect of the invention, in the event that the delay time in response is regulated according to the oil temperature (quantity of state) then, the time period necessary for the mode switch can be made to be an appropriate one which corresponds to the oil temperature and hence to the state of the vehicle then. Namely, irrespective of the oil temperature (for example, whether the oil temperature is high or low), the timing at which the engagement of the one clutch is started can be made appropriate, whereby a risk can be prevented that the one clutch has been engaged completely before the transmission ratio of the toroidal continuously variable transmission reaches the optimal value for switching the mode or a time period longer than necessary is taken from the point in time at which the transmission ratio of the toroidal continuously variable transmission reaches the optimal point for performance of the mode switch to the point in time at which the one clutch has been engaged completely. In addition, as is described in the seventh aspect of the invention, even when the time (timing) to start the engagement of the one clutch is corrected according to the throttle position then, the time period necessary for the mode switch can be made to be an appropriate one which corresponds to the throttle position and hence to the running state of the vehicle then. Namely, irrespective of the throttle position (whether the throttle position is large or small), the timing at which the engagement of the one clutch is started can be made appropriate, whereby the risk can be prevented that the one clutch has been engaged completely before the transmission ratio of the toroidal continuously variable transmission reaches the optimal value for switching the mode or the time period longer than necessary is taken from the point in time at which the transmission ratio of the toroidal continuously variable transmission reaches the optimal point for performance of the mode switch to the point in time at which the one clutch has been engaged completely.

In addition, as is described in the eighth to eleventh aspects of the invention, in the event that the concurrent engagement of both the clutches is made to be determined based on the change in the torque which passes through the toroidal continuously variable transmission, the risk can be prevented that the other clutch which had been in engagement until then is disengaged even though, for example, both the clutches are not engaged concurrently (or before the one clutch has been engaged completely). In other words, the occurrence of a state where neither of the clutches is engaged completely (or the transmission of power is disabled) is prevented, whereby, for example, a drastic increase in engine speed in such a state can be prevented. In addition, on the contrary to the state like this, the continuation of concurrent engagement of both the clutches over the time period longer than necessary without the disengagement of the other clutch even after both the clutches have been engaged can also be prevented.

Note that the change in the torque which passes through the toroidal continuously variable transmission (the passage torque) is obtained by oil pressure sensors which are conventionally placed for detecting the passage torque. Namely, the passage torque can be obtained as a change in differential pressure between a pair of hydraulic chambers of a hydraulic actuator which displaces support members (trunnions) which support power rollers in axial directions of pivot shafts by the oil pressure sensors which are provided in the pair of hydraulic chambers, respectively. Because of this, for example, there is no need to provide additional oil pressure sensors for detecting pressures in hydraulic chambers of the low-speed and high-speed clutches separately from the aforesaid oil pressure sensors in order to determine whether or not both the low-speed and high-speed clutches have been engaged concurrently, thereby making it possible to prevent the complexity in construction of the continuously variable transmission and increase in production costs thereof.

In addition, as is described in the twelfth aspect of the invention, in the event that the construction is adopted which includes the mode which can realize the geared neutral state in which the output shaft is stopped while the input shaft is allowed to be kept rotating in one direction, the mode switch between the low-speed mode and the high-speed mode is performed at low speed. Consequently, the transmission ratio of the toroidal continuously variable transmission is made easy to reach the mode switching point every time the vehicle repeats start and stop, and the necessity of performing the mode switch quickly and smoothly is increased, in which circumstances the advantage of the invention can be obtained more remarkably.

DETAILED DESCRIPTION OF EXEMPLARY EMBODIMENTS OF THE INVENTION EMBODIMENTS

Figure 9:
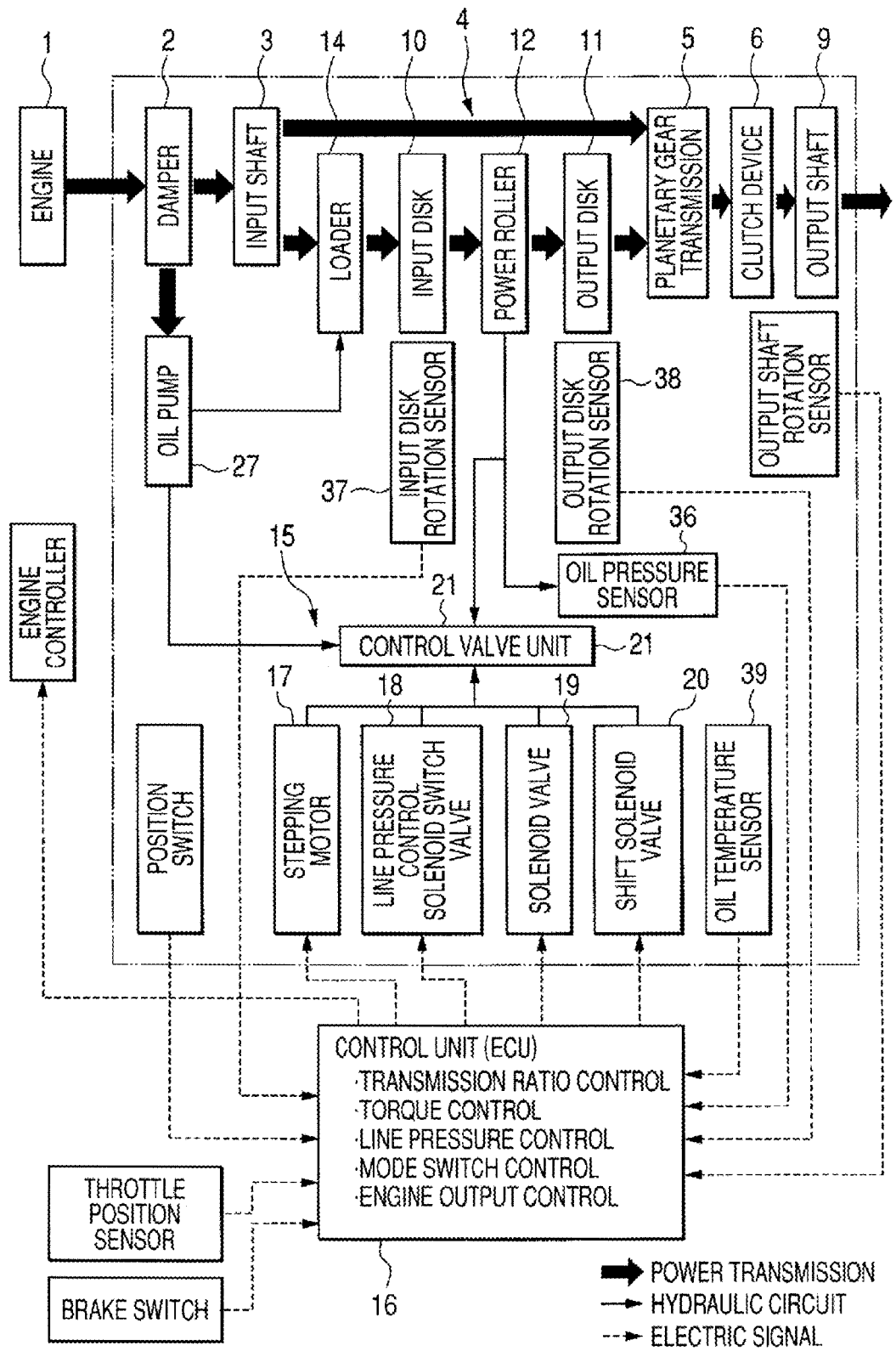
FIG. 9 is a block diagram of a conventional continuously variable transmission.
Figure 10:
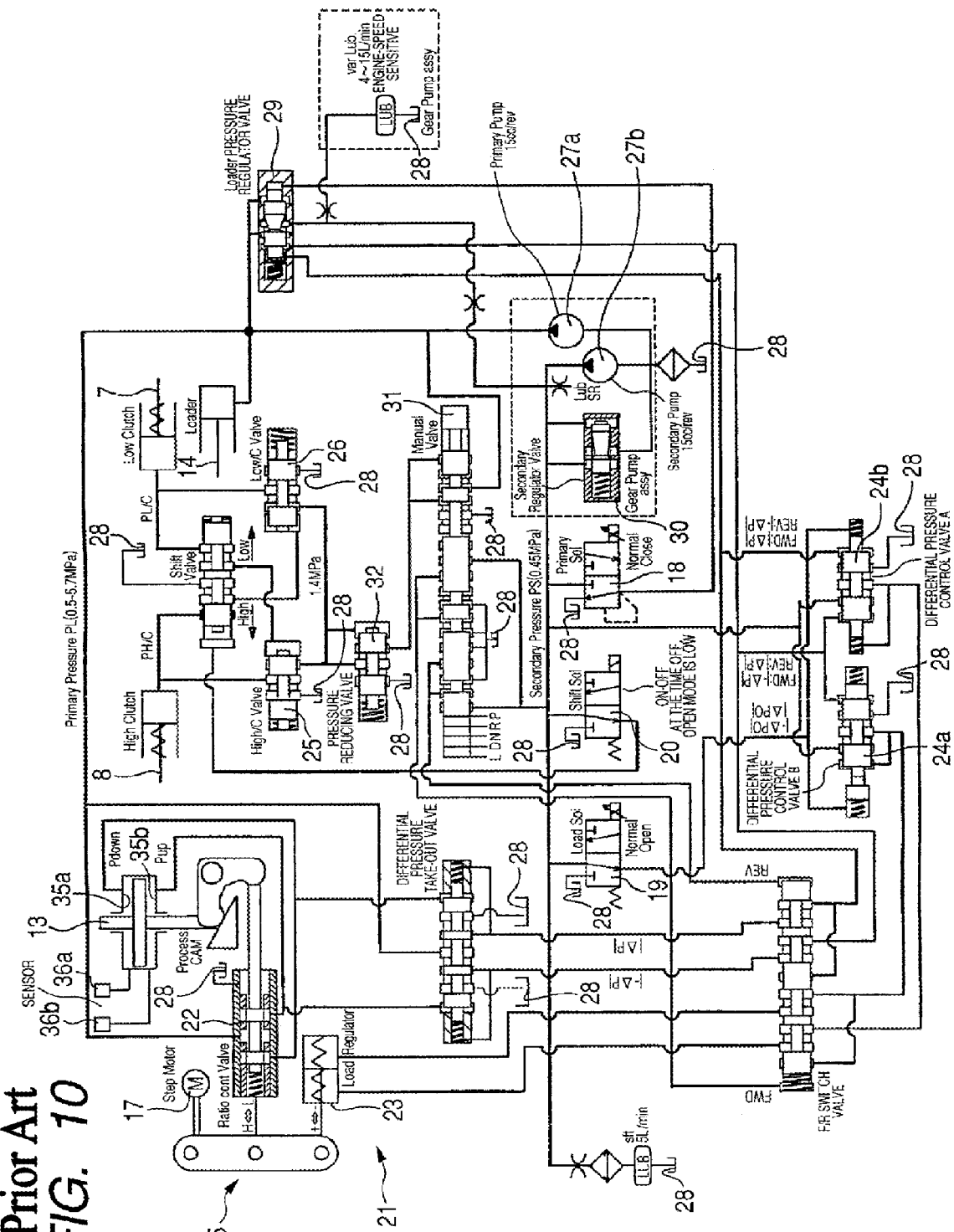
FIG. 10 is a hydraulic circuit diagram which is incorporated in the variously variable transmission.
Figure 11:
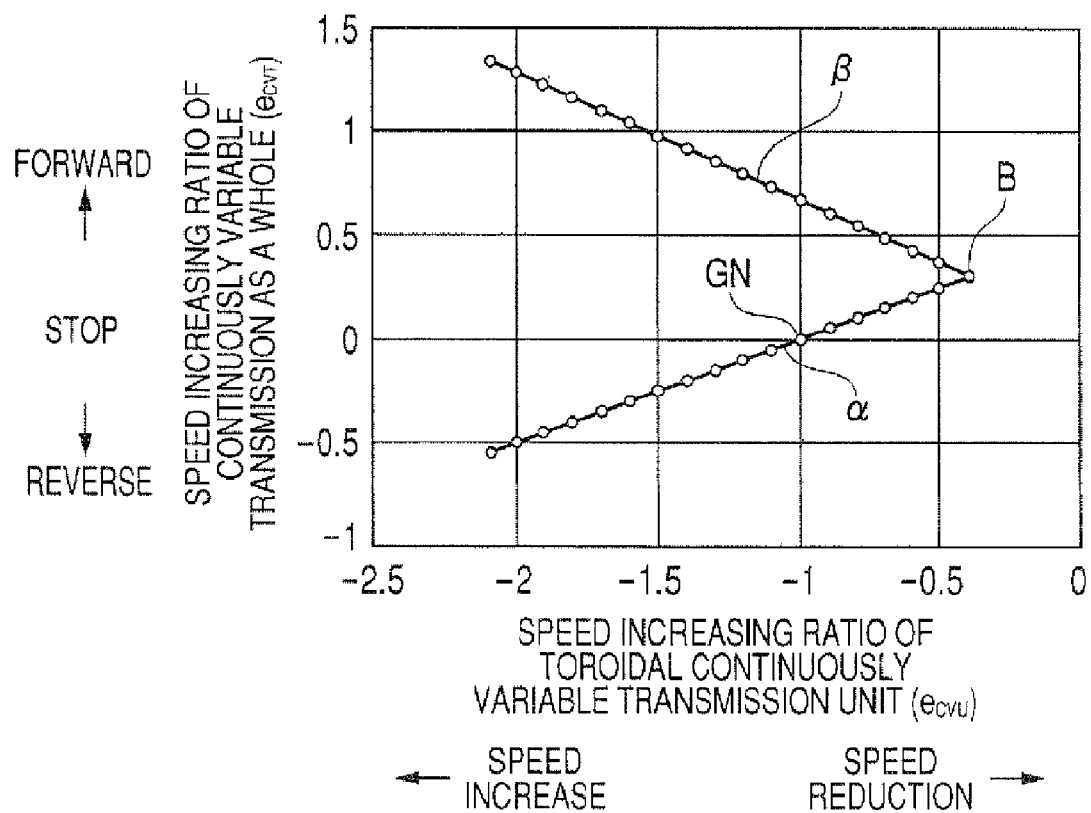
FIG. 11 is a diagram which shows an example of a correlation between the speed ratio of the continuously variable transmission as a whole and the transmission ratio of the toroidal continuously variable transmission.
Figure 12:
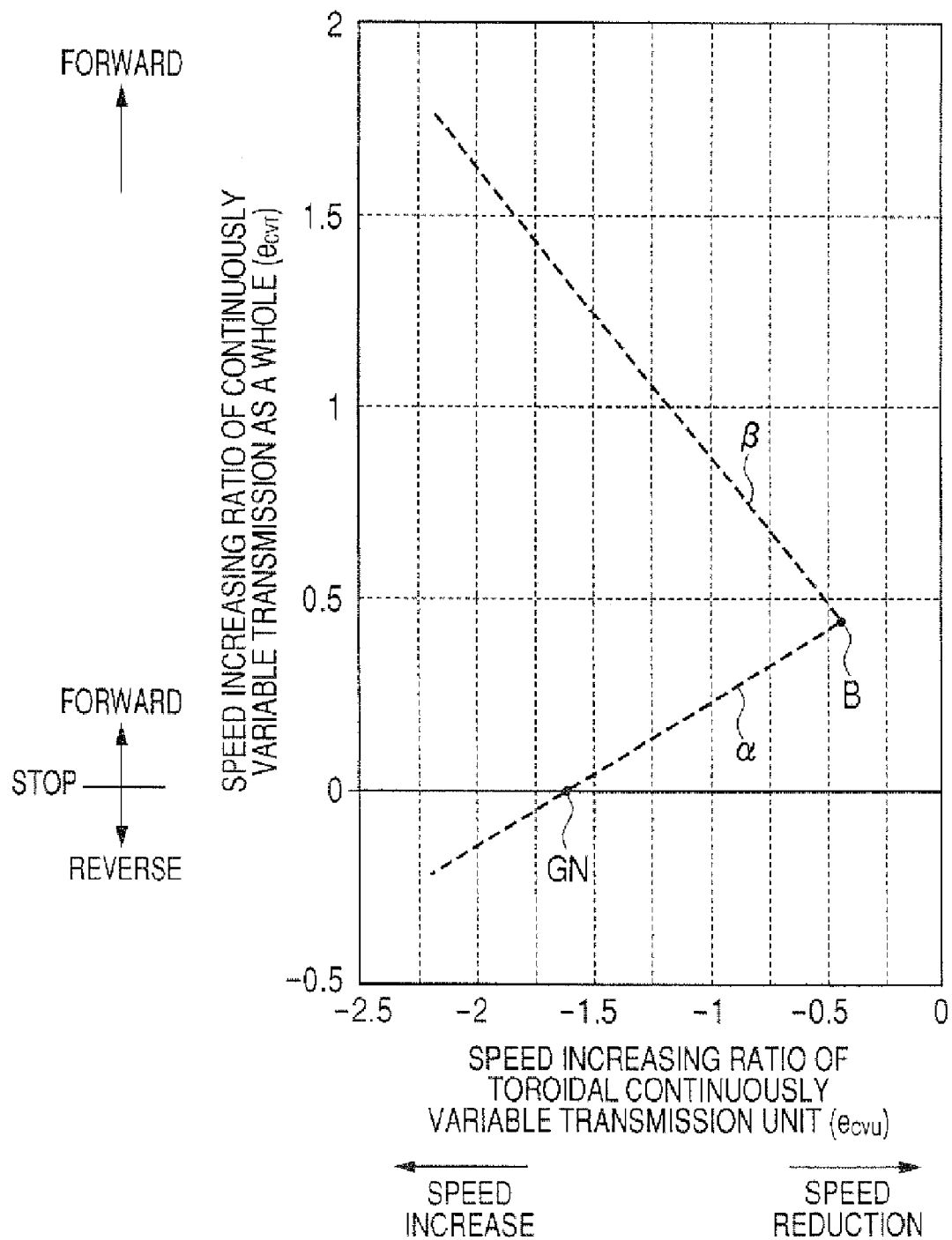
FIG. 12 is a diagram showing another example of the correlation.

FIGS. 1 to 6 depict an embodiment of the invention. The feature of this embodiment resides in the point that a time period substantially necessary for performance of a mode switch between a low-speed mode and a high-speed mode (a time period during which no speed change takes place in a toroidal continuously variable transmission 4) is prevented from being extended by devising a timing to start the engagement of one of clutches (a low-speed clutch 7 or a high-speed clutch 8) which had been in disengagement until then so as to perform the mode switch quickly and smoothly. Since the construction and function of the other portions of the embodiment are similar to those of the conventional construction which is depicted in FIGS. 9 to 10, here, the description thereof will be omitted for no repetition thereof or will be made only briefly, and characteristic portions of this embodiment will mainly be described below. Note that in the case of this embodiment, a relationship between the speed ratio (the speed increasing ratio) of a continuously variable transmission as a whole and the transmission ratio (the speed increasing ratio) of a toroidal continuously variable transmission is set as is shown in FIG. 12. The setting like this is implemented by restricting the reduction ratio of, for example, a planetary gear transmission unit 5 or the gear ratio of power transmission gears.

Also, in the case of this embodiment, by switching the engagement and disengagement of the respective low-speed and high-speed clutches 7, 8 based on control signals from a control unit 16, a low-speed mode in which the reduction ratio is increased (including the geared neutral state) and a high-speed mode in which the reduction ratio is decreased are realized. Because of this, the engagement and disengagement of the respective low-speed and high-speed clutches 7, 8 are made to be freely switched by low-speed clutch and high-speed clutch solenoid switch valves 33, 34 whose energized states are controlled based on control signals from the control unit 16. Namely, these respective low-speed clutch and high-speed clutch solenoid switch valves 33, 34 are such that respective spools thereof are displaced with energization to the solenoids, and the engagement and disengagement of the respective low-speed and high-speed clutches 7, 8 are switched by switching introduction states of pressure oils into interiors of hydraulic chambers of the low-speed and high-speed clutches 7, 8 based on the displacement of the spools.

Figure 1:
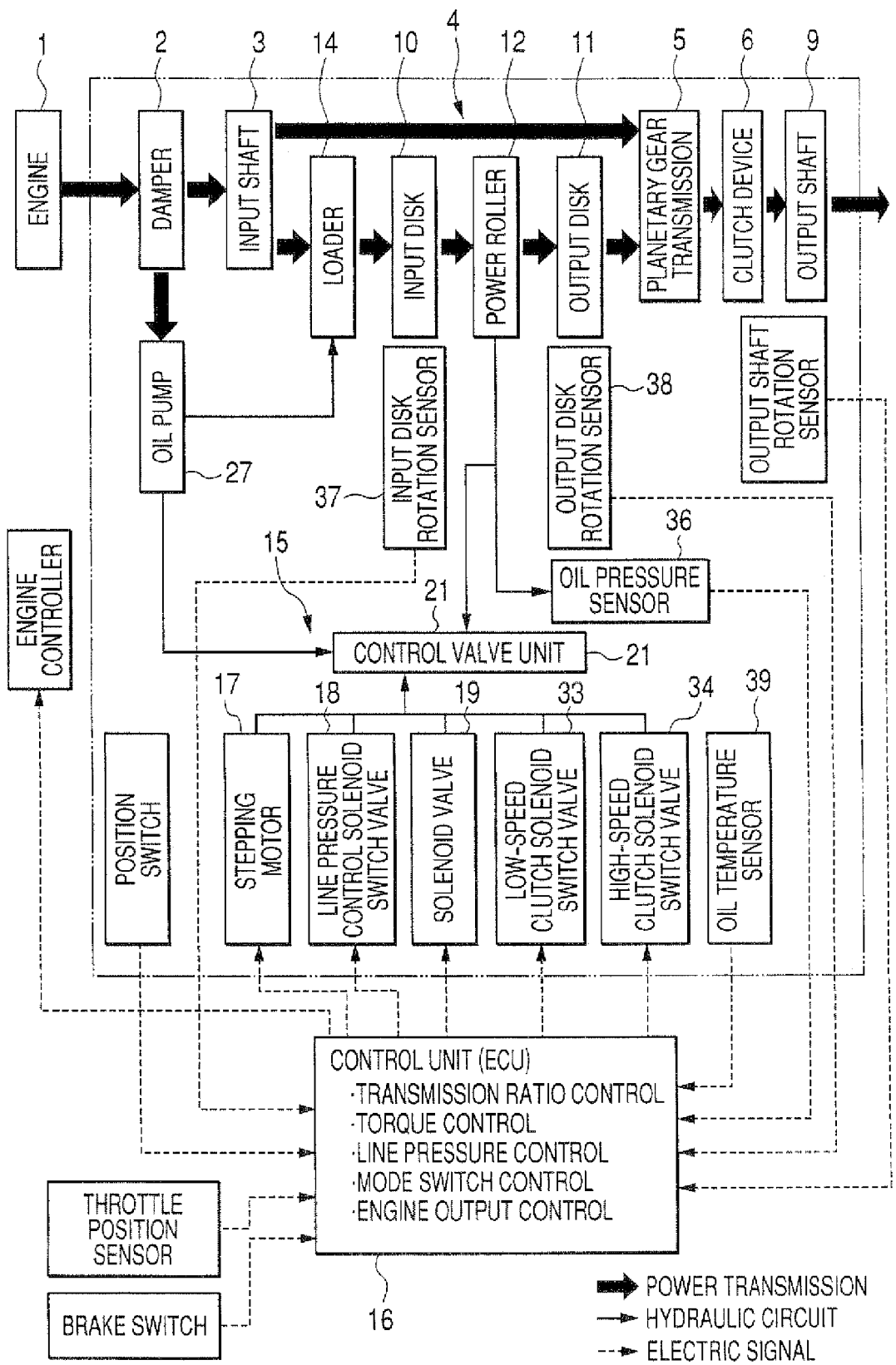
FIG. 1 is a block diagram of a continuously variable transmission, which shows an example of an embodiment of the invention.
Figure 2:
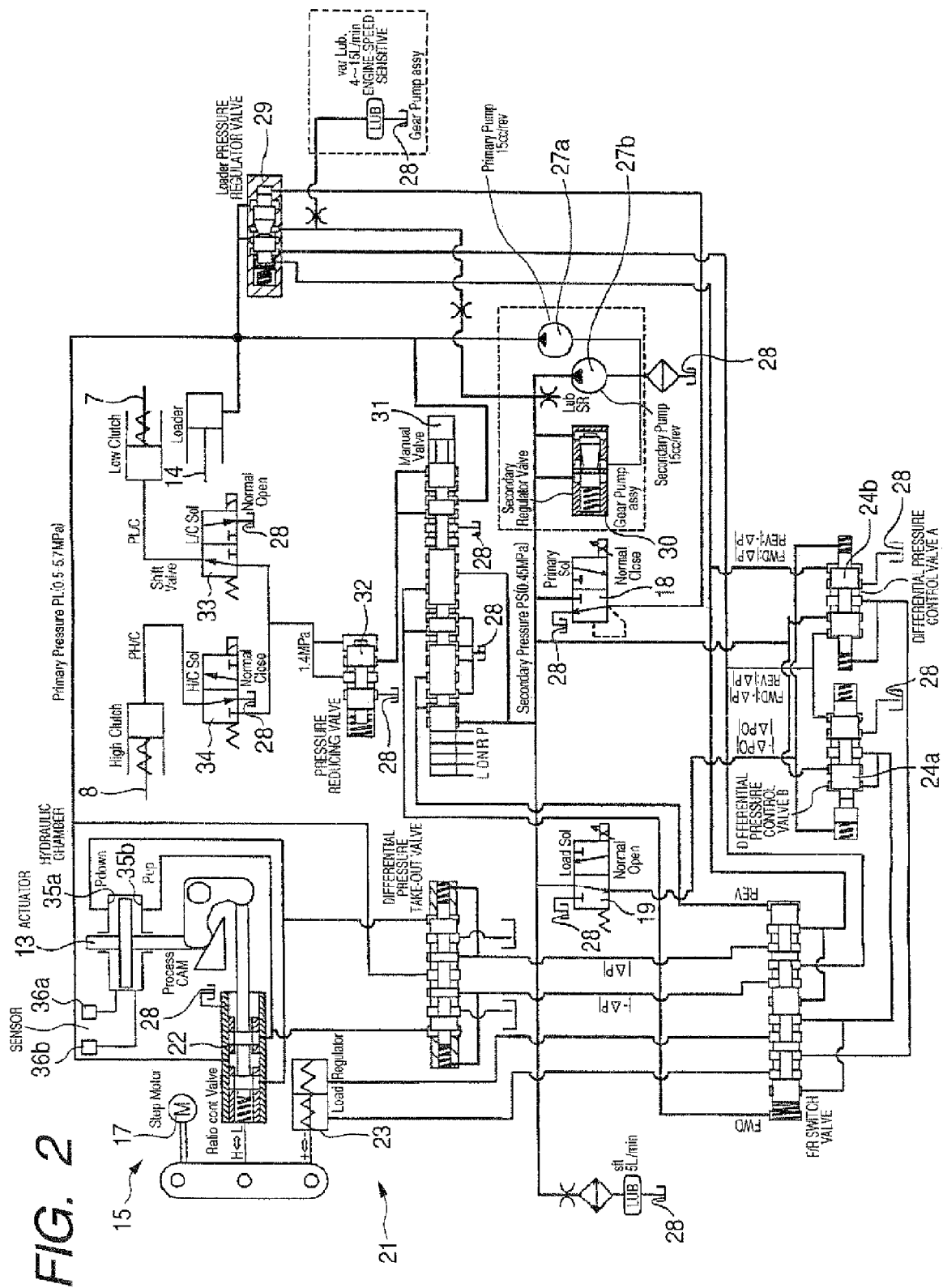
FIG. 2 is a hydraulic circuit diagram which is incorporated in the continuously variable transmission.

For example, in a case where the low-speed clutch 7 is engaged, while the high-speed clutch 8 is disengaged (in a case where the low-speed mode is realized), the low-speed clutch and high-speed clutch solenoid switch valves 33, 34 are de-energized, so that the respective spools of the solenoid switch valves 33, 34 are displaced rightwards in FIG. 2 (a state of a left-half portion of a circuit denoting each spool) based on elastic forces of springs. As a result, pressure oil is introduced into the hydraulic chamber of the low-speed clutch 7 so that the low-speed clutch 7 is engaged, while the hydraulic chamber of the high-speed clutch 8 is allowed to communicate with an oil reservoir 28 so that the high-speed clutch 8 is disengaged.

On the other hand, in a case where the low-speed clutch 7 is disengaged, while the high-speed clutch 8 is engaged (in a case where the high-speed mode is realized), the low-speed clutch and high-speed clutch solenoid switch valves 33, 34 are energized, so that the respective spools of the solenoid switch valves 33, 34 are displaced leftwards in FIG. 2 (a state of a right-half portion of the circuit denoting each spool) against the elastic forces of the springs. As a result, the hydraulic chamber of the low-speed clutch 7 is allowed to communicate with an oil reservoir 28 so that the low-speed clutch 7 is disengaged, while pressure oil is introduced into the hydraulic chamber of the high-speed clutch 8 so that the high-speed clutch 8 is engaged, while.

Figure 3:
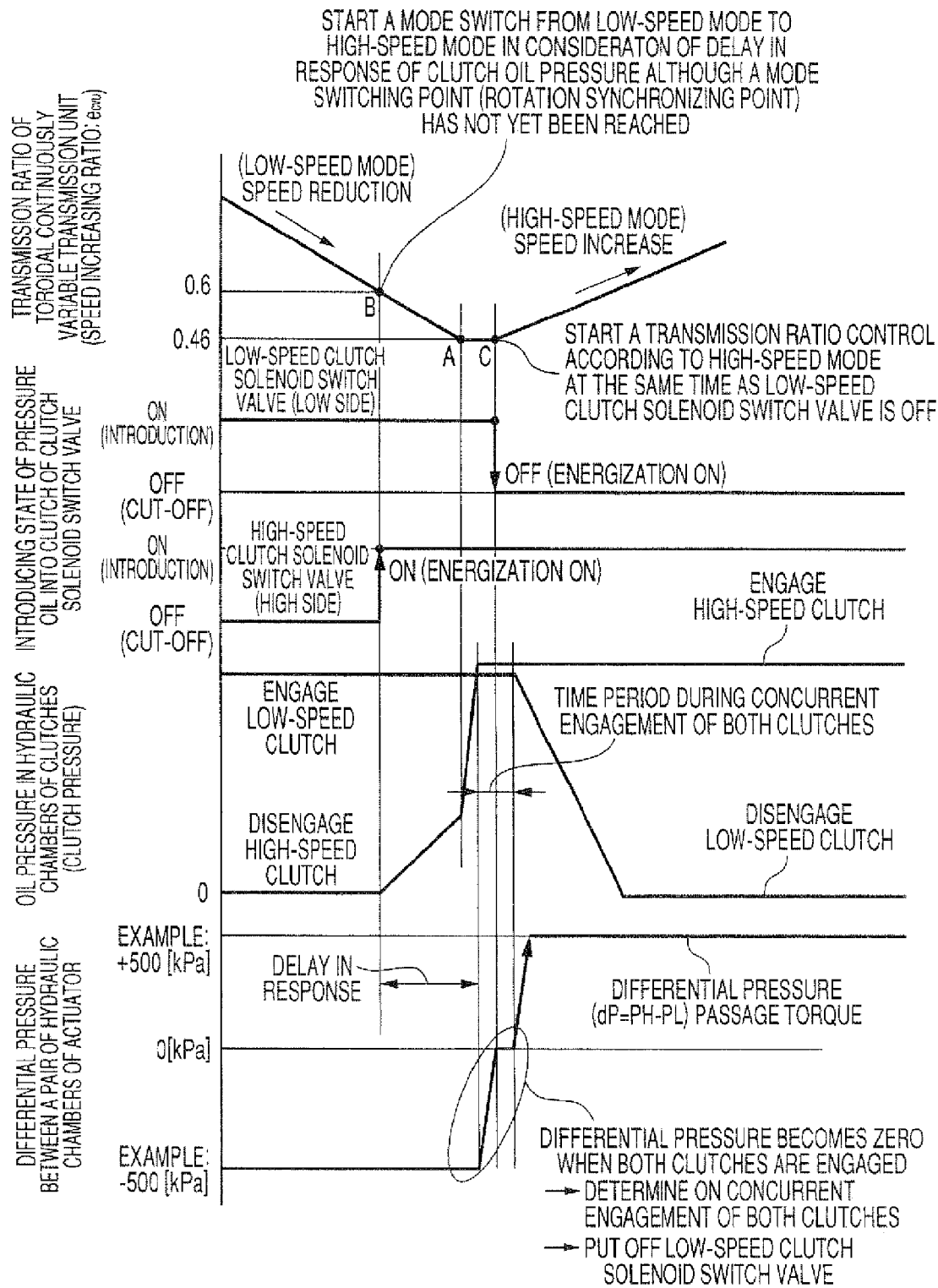
FIG. 3 is a diagram showing a relationship between a transmission ratio of a toroidal continuously variable transmission, a switching state of low-speed clutch and high-speed clutch solenoid switch valves, the engagement and disengagement of low-speed and high-speed clutches and a differential pressure between a pair of hydraulic chambers which make up an actuator.

In addition, in the case of this embodiment, a mode switch between the low-speed mode and the high-speed mode is performed in a way as shown in, for example, FIG. 3. Note that FIG. 3 exemplarily illustrates an operating state of each portion which results when a mode switch is performed from the low-speed mode to the high-speed mode during acceleration (or in such a state that an accelerator pedal is depressed). In the case of this embodiment, the following functions are imparted to the control unit 16 in order to perform the mode switch shown in FIG. 3. Note that while FIG. 3 shows the mode switch from the low-speed mode to the high-speed mode, substantially the same thing happens for a mode switch from the high-speed mode to the low-speed mode except that matters which will be described in association with the low speed and the high speed are reversed, and therefore, in the following description, the mode switch from the low-speed mode to the high-speed mode will mainly be described.

Firstly, as a first function, the control unit 16 is imparted a function in which when the mode switch is performed between the low-speed mode and the high-speed mode, after one of the low-speed clutch 7 and the high-speed clutch 8 which had been in disengaged until then has been engaged, the other clutch which had been in engagement until then is disengaged. Namely, when the mode switch is performed from the low-speed mode to the high-speed mode, as is shown in FIG. 3, the control unit 16 is designed such that the low-speed clutch 7 is disengaged after the high-speed clutch 8 has been engaged. In addition, on the contrary to this, although not shown, when a mode switch is performed from the high-speed mode to the low-speed mode, the control unit 16 is designed such that the high-speed clutch 8 is disengaged after the low-speed clutch 7 has been engaged.

Furthermore, in the case of this embodiment, as a second function, the control unit 16 is imparted a function in which one of the clutches which had been in disengagement until then (the high-speed clutch 8 in FIG. 3) is started to he engaged (or the energization of the high-speed clutch solenoid switch valve 34 is ON) before a transmission ratio of the toroidal continuously variable transmission 4 which is regulated according to a running state of a vehicle then (or a target transmission ratio which corresponds thereto) has reached an optimal value for performance of the mode switch (a point A in FIG. 3, for example, 0.46 in a speed increasing ratio) or at a point B in FIG. 3 (for example, 0.60 in the speed increasing ratio). Then, a reduction in a time period considered necessary for the mode switch (a time period during which no speed change takes place in the toroidal continuously variable transmission 4) is realized by the function so imparted. As has been described in the section related to the background art, prior to a description of this feature of the invention, a case will be described using FIG. 7 where the time period necessary for the mode switch becomes long (or where a drawback is caused). As with FIG. 3, FIG. 7 also shows exemplarily an operating state of each portion which results at the time of performing a mode switch from the low-speed mode to the high-speed mode during acceleration (or in such a state that the accelerator pedal is depressed).

Figure 7:
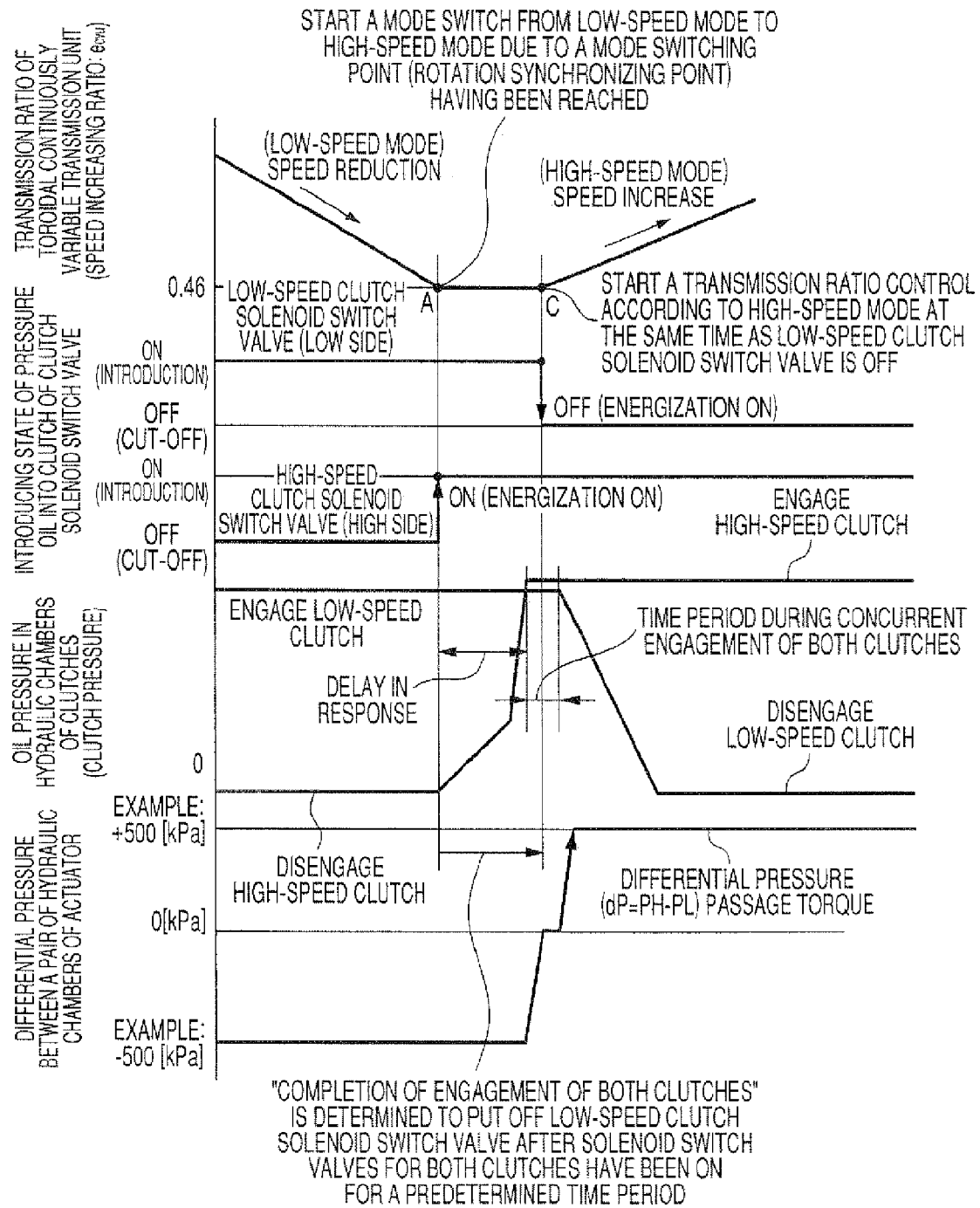
FIG. 7 is a diagram similar to FIG. 3 which shows a case where a mode switching time period is extended.
Figure 8:
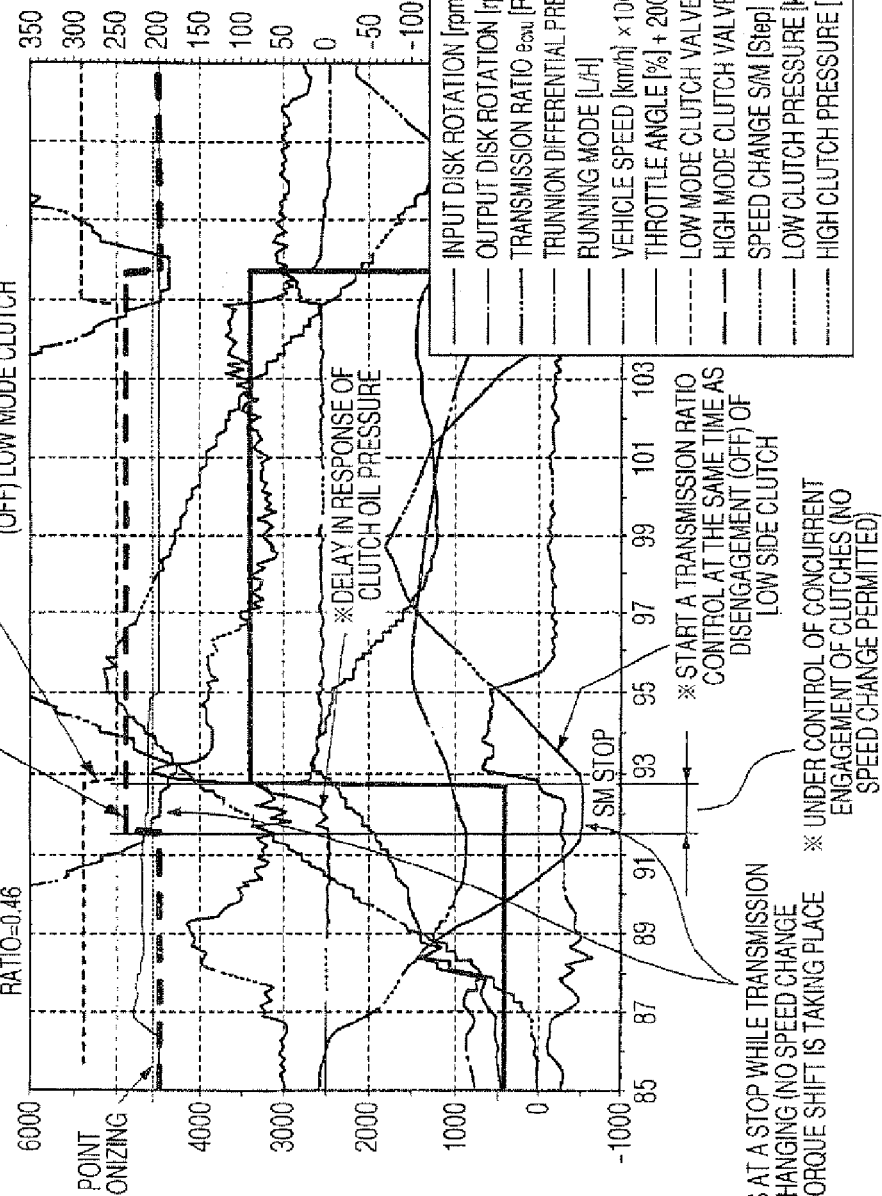
FIG. 8 is a diagram which shows how each portion changes when a control shown in FIG. 7 is performed on an actual vehicle.

In the case of the mode switch shown in FIG. 7, the engagement of a high-speed clutch 8, which had been in disengagement until then, is started (or the energization of a high-speed clutch solenoid switch valve 34 is ON) on condition that a transmission ratio of a toroidal continuously variable transmission 4 has reached a mode switching point (a point A in FIG. 7, for example, 0.46 in a speed increasing ratio). In addition, a low-speed clutch 7, which had been in engagement until then, is disengaged after a predetermined time period has elapsed since the start of the engagement of the high-speed clutch 8 (for example, after an appropriate time period according to an oil temperature then has elapsed), whereby a time period is secured during which the low-speed and high-speed clutches 7, 8 are in engagement concurrently. As has been described in the section related to the background art, as to the engagement of the high-speed clutch 8, a certain time period is required (or a delay in oil pressure response is generated) from a point in time at which the high-speed clutch 8 is started to be engaged to a point in time at which the high-speed clutch 8 is engaged completely according to a state resulting when the mode switch is performed or according to an oil temperature and temperature characteristics of a friction material which makes up the clutch 8 and furthermore based on an unavoidable delay in mechanical response. Due to this, when a mode switch like the one shown in FIG. 7 is performed, the transmission ratio of the toroidal continuously variable transmission 4 is forced to be held at the mode switching point from the point in time at which the high-speed clutch 8 is started to be engaged until the point in time at which the high-speed clutch 8 is engaged completely, that is, from the point A to a point C in FIG. 7. As this occurs, a time period during which no speed change takes place in the toroidal continuously variable transmission 4 becomes long, and this means that a time period necessary for performance of the mode switch substantially becomes long Note that FIG. 8 shows a change in state of each portion when the mode switch shown in FIG. 7 is performed in the way described above.

On the contrary to this, in the case of the embodiment, as is shown in FIG. 3, the engagement of the high-speed clutch 8 is made to be started before the transmission ratio of the toroidal continuously variable transmission 4 has reached the optical point for performance of the mode switch (the point A in FIG. 3). To be more specific, the engagement of the high-speed clutch 8 is started (or the energization of the high-speed clutch solenoid switch valve 34 is ON) at the point B in FIG. 3 based on a time delay in response of the high-speed clutch 8 obtained in advance or an time delay in response considered necessary from the point in time at which the high-speed clutch 8 is started to be engaged until the point in time at which the high-speed clutch 8 is completely engaged. Then, even though the engagement of the high-speed clutch 8 is started in this way, the transmission ratio of the toroidal continuously variable transmission 4 continues to be regulated towards the optimal value for switching the mode (according to the target transmission ratio corresponding to the running state of the vehicle then) without being held at the value which resulted when the mode switch was started. Because of this, as is clear when compared to FIG. 7, a time period during which no speed change takes place in the toroidal continuously variable transmission 4 (the time period taken to move from the point A to the point C in FIGS. 3 and 7) can be made short, thereby making it possible to make short a time period which is substantially necessary for performing the mode switch.

In the case of this embodiment that is configured as has been described above, a time (timing) to start the engagement of the high-speed clutch S which had been in disengagement until then is obtained in the following manner. Namely, while the vehicle is being driven (at least while the vehicle is being driven with the transmission ratio of the toroidal continuously variable transmission 4 lying in the vicinity of the optimal value for switching the mode (for example, the mode switching point)), an estimated reaching time which is considered necessary for the transmission ratio of the toroidal continuously variable transmission 4 to reach the optimal value for switching the mode from a value at a current point in time is obtained at all times from the current transmission ratio and change-speed of the toroidal continuously variable transmission 4. Note that the transmission ratio can be obtained from a ratio of rotational speeds of input and output disks 10, 11 that are detected by input and output disk rotation sensors 37, 38 or a correlation between a step position of a stepping motor 17 which is obtained in advance and a transmission ratio. In addition, the change-speed is obtained as a variation of the transmission ratio per unit time by monitoring a change in the transmission ratio. Then, the engagement of the high-speed clutch 8 is designed to be started (or the high-speed clutch solenoid switch valve 34 is put to ON) on condition that the reaching time which is obtained from the current transmission ratio and change-speed in the way described above is determined to become equal to or less than the delay time in response of the high-speed clutch 8 (the reaching time≦the delay time in response) (or, for example, immediately such a determination is made) by comparing the reaching time with the delay time in response.

In addition, in the case of this embodiment, the delay time in response is made to be an estimated time period considered necessary for an oil pressure that is introduced into the high-speed clutch 8 to rise to a sufficient value to perform a power transmission from a point in time at which the high-speed clutch solenoid switch valve 34 is actuated (the energization thereof is ON) in order to engage the high-speed clutch 8. In addition, this time delay in response is designed to be regulated to an (appropriate) value which corresponds to an oil temperature (quantity of state) then based on a quantity of state which affects the length of the delay time in response, that is, the temperature of pressure oil that is introduced into the hydraulic chambers of the low-speed and high-speed clutches 7, 8. Namely, as has been described above, the higher the oil temperature becomes, the shorter the delay time in response from the start and the end of the engagement of the low-speed and high-speed clutches 7, 8 becomes, and on the contrary, the lower the oil temperature becomes, the longer the delay time in response becomes. Then, in the case of this embodiment, a relationship between oil temperatures and appropriate time delays in response to the oil temperatures is obtained in advance through experiments, simulations and the like for storage in a memory of the control unit 16 in the form of maps as shown in Tables 1, 2. In addition, the oil temperature and the delay time in response are measured at all times while the vehicle is being driven, so that the control unit 16 may be made to learn the relationship between the oil temperature and the delay time in response as required

TABLE 1

When the low-speed mode is currently adopted
(time delays in response from the point in time at which the high-speed clutch solenoid switch valve is actuated until the point in time at which the high-speed clutch is completely engaged)
Oil temperatures: −40 −20 0 20 40 60 80 100 120 140 160 [° C.]
Time: 1.7 1.65 1.57 1.43 1.25 1.18 1.05 0.97 0.91 0.09 0.89
Delays in response
(T_OKURE) [sec]

TABLE 2

When the high-speed mode is currently adopted
(time delays in response from the point in time at which the low-speed clutch solenoid switch valve is actuated until the point in time at which the low-speed clutch is completely engaged)
Oil temperatures: −40 −20 0 20 40 60 80 100 120 140 160 [° C.]
Time: 1.2 1.15 1.07 0.93 0.75 0.56 0.40 0.40 0.40 0.40 0.40
Delays in response
(T_OKURE) [sec]

In addition, of these tables, Table 1 shows a relationship (a map) between oil temperatures and time delays in response which are used when the mode switch is performed from the low-speed mode to the high-speed mode (when the high-speed clutch 8 is engaged), while Table 2 shows a relationship (a map) between oil temperatures and time delays in response which are used when the mode switch is performed from the high-speed mode to the low-speed mode (when the low-speed clutch 7 is engaged).

In the case of this embodiment, an appropriate time delay in response corresponding to an oil temperature then is obtained based on the map described above and an oil temperature detected by an oil temperature sensor 39, so as to regulate the time (timing) to start the engagement of the high-speed clutch 8 according to the delay time in response so obtained. Namely, the engagement of the high-speed clutch 8 is started (or the energization of the high-speed clutch solenoid switch valve 34 is on) on condition that the reaching time which is obtained from the current transmission ratio and change-speed is determined to become equal to or less than the delay time in response which corresponds to the oil temperature then (the reaching time≦the delay time in response) (or, for example, immediately such a determination is made) by comparing the delay time in response with the reaching time. In addition, by correcting the delay time in response or the reaching time according to a throttle position then, the time (timing) to start the engagement of the high-speed clutch 8 which is obtained from a relationship between the reaching time and the delay time in response can also be regulated (corrected) to an optimal value according to the throttle position.

Furthermore, in the case of the embodiment, as a third function, the control unit 16 is imparted a function in which the concurrent engagement of the high-speed clutch 8 and the low-speed clutch 7 which occurs after the engagement of the high-speed clutch 8 in the way described above is determined based on a change in a torque which passes the toroidal continuously variable transmission 4 (a passage torque). Namely, when a state results where the low-speed and high-speed clutches 7, 8 are engaged concurrently, the passage torque changes in value towards 0 from a value which resulted in a state where only the other clutch had been in engagement. Because of this, whether or not the low-speed and high-speed clutches 7, 8 are engaged concurrently can be determined by detecting a change in the passage torque like one described above. Then, in the case of this embodiment, the passage torque is obtained from a differential pressure, which is a value corresponding to the passage torque, between a pair of hydraulic chambers 35a, 35b which are provided in a hydraulic actuator 13 for displacing support members (trunnions) which support power rollers 12 in axial directions of pivot shafts. Because of this, oil pressure sensors 36 (36a, 36b in FIG. 2) are provided in the hydraulic chambers 35a, 35b, respectively, and detection signals of these oil pressure sensors 36a, 36b are inputted into the control unit 16.

Then, the occurrence of a concurrent engagement of both the low-speed and high-speed clutches 7, 8 is determined according to the differential pressure between the pair of hydraulic chambers 35a, 35b, and the low-speed clutch 7, which had been in engagement until then, is disengaged on condition that such a determination is dully made. Namely, as has been described previously, when the estimated reaching time which is considered necessary for the transmission ratio of the toroidal continuously variable transmission 4 to reach the mode switching point is determined to become equal to or less than the delay time in response which is considered necessary from the point in time at which the high-speed clutch 8 is started to be engaged until the point in time at which the high-speed clutch 8 is completely engaged (the reaching time≦the delay time in response), the high-speed clutch solenoid switch valve 34 is switched (or the energization state thereof becomes ON). In addition, the oil pressure inside the hydraulic chamber of the high-speed clutch 8 is increased based on the switching of the relevant switch valve 34, and when there occurs a concurrent engagement of both the low-speed and high-speed clutches 7, 8, the differential pressure, which is the value corresponding to the passage torque, changes towards 0 from a value then (for example, −500 kPa).

Then, the concurrent engagement of both the clutches 7, 8 is determined based on the change in the differential pressure by the control unit 16. For example, whether or not there occurs the concurrent engagement of both the clutches 7, 8 is determined by, for example, whether or not the differential pressure (the passage torque) becomes 0. Alternatively, the concurrent engagement of the clutches can also be determined by whether or not the differential pressure (the passage torque) has changed towards 0 by a predetermined amount or whether or not the differential pressure (the passage torque) has changed towards 0 at a predetermined speed (or faster). In any case, the low-speed clutch solenoid switch valve 33 is switched (the energization state thereof is put to OFF) in order to disconnect the low-speed clutch 7, which had been in engagement until then, on condition that both the clutches 7, 8 are determined to have been engaged concurrently based on the change in differential pressure.

The functions imparted to the control unit 16 to control the engagement and disengagement of each of the low-speed and high-speed clutches 7, 8 in the ways described heretofore will be described by reference to a flowchart shown in FIG. 4. Note that operations shown in this flowchart are performed repeatedly (automatically) during a time period from a point in time at which an ignition switch is ON until a point in time at which the ignition switch is OFF, or, at least while the vehicle is being driven with the transmission ratio of the toroidal continuously variable transmission 4 lying in the vicinity of the value at which the mode switch is performed (for example, the mode switching point).

Firstly, in step 1, the control unit 16 obtains an estimated reaching time T_MODE_CEG which is considered necessary for the transmission ratio of the toroidal continuously variable transmission 4 to reach an optimal value for performance of the mode switch (for example, the mode switching point (a rotation synchronizing point), 0.46 in the speed increasing ratio) from a value at the current point in time. This reaching time T_MODE_CHS is obtained from, for example, the following equation (1).

$$T\_MODE\_CHG = (e_{cvu}\_Real - 0.46)/SFT\_SPD \quad (1)$$

where $e_{cvu}\_Real$: the current transmission ratio of the toroidal continuously variable transmission 4; 0.46: mode switching point (rotation synchronizing point); and SFT_SPD: the current change-speed (variation in speed per unit time, for example, 0.01/1 ms).

Note that the current transmission ratio $e_{cvu}\_Real$ can be obtained, as has been described before, from the ratio of the rotational speeds of the input and output disks 10, 11 which are detected by the input and output disk rotation sensors 37, 38 or the correlation between the step position of the stepping motor 17 that is obtained in advance and the transmission ratio. In addition, the current change-speed SFT_SPD can be obtained as a variation of the current transmission ratio $e_{cvu}\_Real$ per unit time (for example, millisecond).

If the reaching time T_MODE_CHG is obtained in this way in step 1, then proceed to step 2. In this step 2, if one of the clutches (the low-speed clutch 7 or the high-speed clutch 8) which had been in disengagement until then is started to be engaged, an estimated time delay in response T_MODE_OIL according to a quantity of state (an oil temperature) then which is considered necessary from the start to the end of the engagement so started is obtained. This time delay in response T_MODE_OIL is obtained in the following manner. Firstly, a current oil temperature that is detected based on the oil temperature sensor 39, a current running mode which is determined from the current operating states (energized states) of the low-speed clutch and high-speed clutch solenoid switch valves 33, 34, and an oil temperature then and a time delay in response T_OKURE which are available from Table 1 or Table 2 are obtained. Then, by correcting the delay time in response T_OKURE so obtained according to a throttle position then, the delay time in response T_MODE_OIL is obtained. To be specific, this time delay in response T_MODE_OIL is obtained (or the delay time in response T_OKURE is corrected) using, for example, the following equation (2).

$$T\_MODE\_OIL = T\_OKURE + (\text{throttle position [\%]}/100) \quad (2)$$

If the delay time in response T_MODE_OIL is obtained in the way described above in step 2, then proceed to step 3, where whether or not a mode switch is started is determined. Namely, whether or not the engagement of the one clutch (the low-speed clutch 7 or the high-speed clutch 8) which has been in disengagement currently is started is determined. This determination is made by comparing the reaching time T_MODE_CHG with the delay time in response T_MODE_OIL to see whether or not the reaching time T_MODE_CHG becomes equal to or less than the delay time in response T_MODE_OIL (T_MODE_CHG≦T_MODE_OIL). In step 3 like this, if the reaching time T_MODE_CHG is determined to become equal to or less than the delay time in response T_MODE_OIL (T_MODE_CHG≦T_MODE_OIL), the mode switch is started. Namely, if the aforesaid determination is made from the current time delay in response T_MODE_OIL and reaching time T_MODE_CHG, it can be determined that the transmission ratio of the toroidal continuously variable transmission 4 has reached a value which corresponds to the point B in FIG. 3 which lies before the mode switching point corresponding to the point A in the same figure. Then, proceed to step 4, where a mode switch operation is performed.

Figure 5:
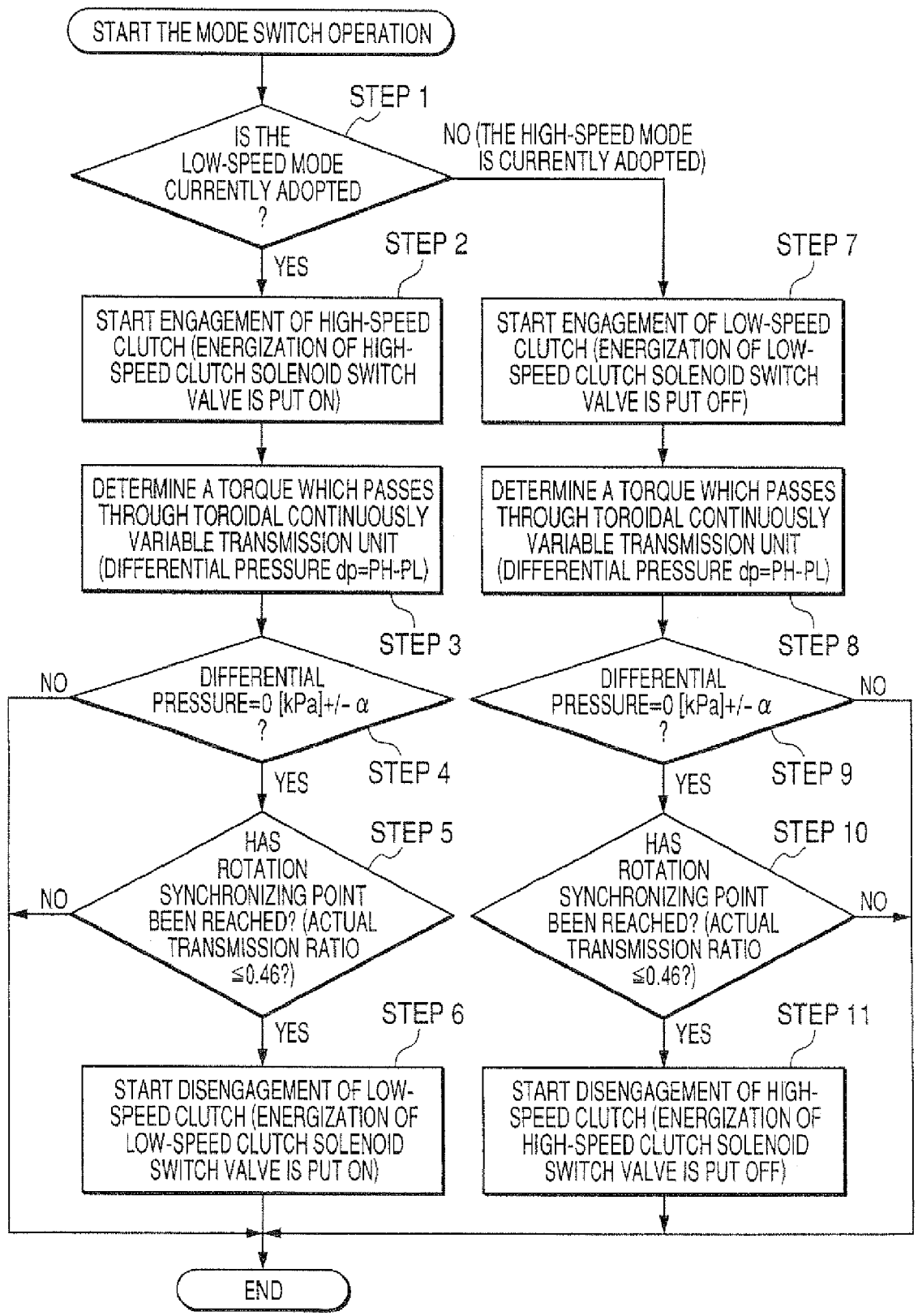
FIG. 5 is a flowchart of a mode switching operation.

The mode switch operation in step 4 is performed along a flowchart shown in FIG. 5. Namely, firstly, in step 1 in FIG. 5, the current running mode is determined (or whether or not the low-speed mode is currently adopted is determined). This determination is made based on the current operating states of the low-speed clutch and high-speed clutch solenoid switch valves 33, 34. In this step 1, if it is determined that the current running mode is the low-speed mode (the current energizing state of the low-speed clutch solenoid switch valve 33 is OFF and pressure oil is currently introduced into the low-speed clutch 7), then proceed to step 2, where the high-speed clutch solenoid switch valve 34 is switched (the energizing state thereof is put to ON) in order to engage the high-speed clutch 8. Note that in the case of this embodiment, even through the high-speed clutch solenoid switch valve 34 is switched in the way described above, the transmission ratio of the toroidal continuously variable transmission 4 continues to be regulated toward the optimal value for switching the mode without being held at a value which resulted when the mode switch was started. Following this, as shown in step 3, to obtain a torque which passes through the toroidal continuously variable transmission 4 (a passage torque), a change in the differential pressure between the pair of hydraulic chambers 35a, 35b making up the actuator 13 which is a value corresponding to the passage torque is detected.

Namely, as is shown in the following step 4, whether or not the differential pressure becomes 0 (the differential pressure=0) is determined. To be more specific, whether or not the differential pressure falls within a range of a hysteresis α that is determined through tuning or the like (the differential pressure≦|0±α|) is determined. Note that this hysteresis α is set in advance to an optimal value obtained through experiments or the like. In step 4 like this, if the differential pressure does not become 0 (or does not fall within a range of 0±α), (since both the clutches 7, 8 have not yet been engaged concurrently,) the process is then brought to end and thereafter returns to step 4 in FIG. 5 via end, start and steps 1 to 4 in FIG. 4 and start (start of the node switch operation) and steps 1 to 3 in FIG. 5. Then, this series of operations is repeated until the differential pressure becomes 0 (or falls within the range of 0±α). Note that if a different determination from the previous one is made in a step on the way returning to step 4 in FIG. 5 in the manner described above, then proceed to a step directed by the determination so made. On the other hand, in this step 4, if it is determined that the differential pressure has become 0 (of fallen within the range of 0±α) and both the low-speed and high-speed clutches 7, 8 are engagement concurrently, as is shown in the following step 5, whether or not the current transmission ratio of the toroidal continuously variable transmission 4 has reached the mode switching point (the rotation synchronizing point, for example, the value corresponding to the point A in FIG. 3, 0.46 or less in the speed increasing ratio).

Figure 4:
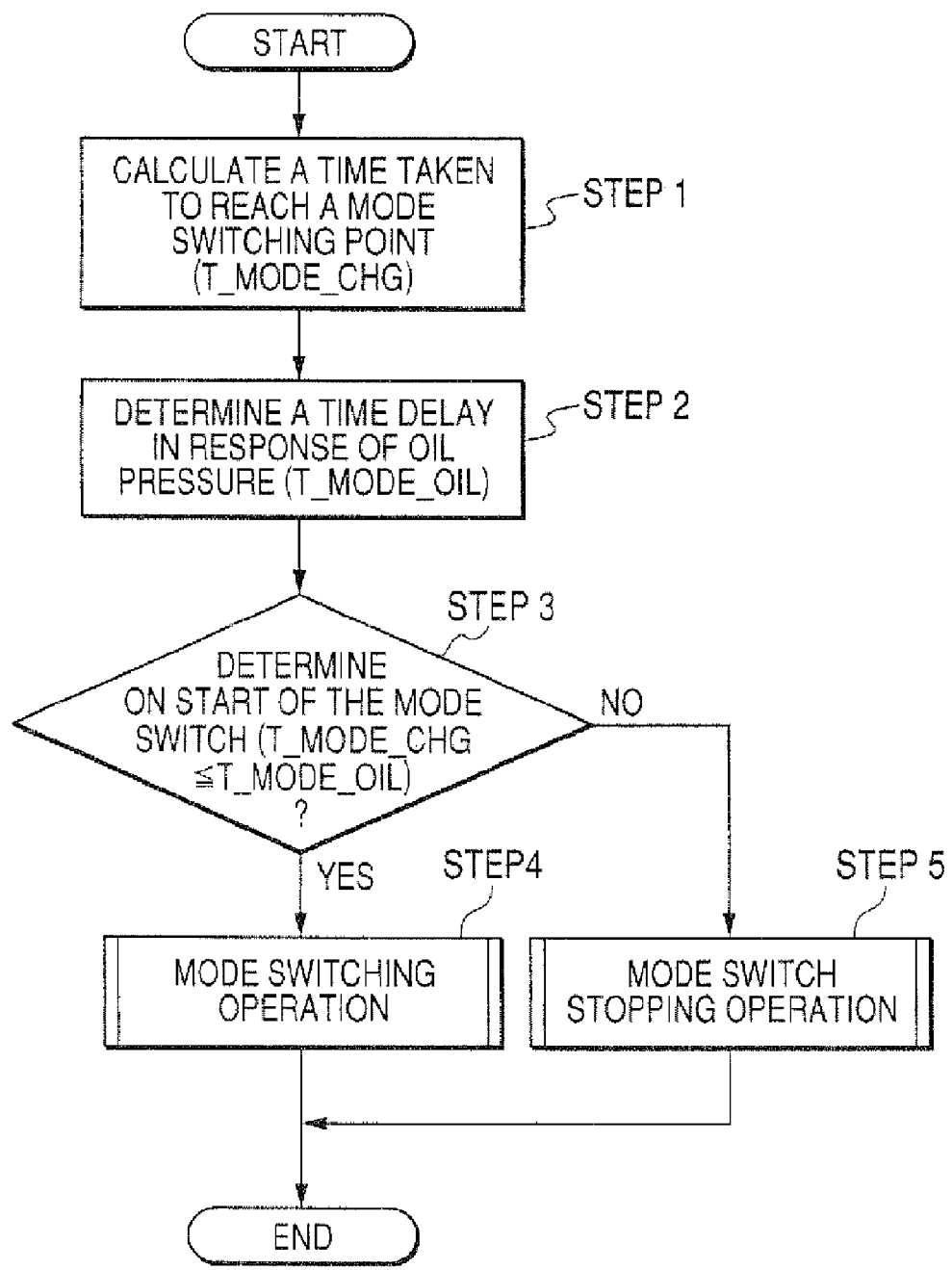
FIG. 4 is a flowchart which shows operations characteristic of the example of the embodiment.

In step 5 like this, if the transmission ratio is not determined to have reached the mode switching point, (since a speed change control according to the high-speed mode has not yet been able to be started,) the process is then brought to end and thereafter returns to step 5 in FIG. 5 via end, start and steps 1 to 4 in FIG. 4 and start (start of the mode switch operation) and steps 1 to 4 in FIG. 5. Then, this series of operations is repeated until the transmission ratio reaches the mode switching point. Note that if a different determination from the previous one is made in a step on the way returning to step 5 in FIG. 5 in the manner described above, then proceed to a step directed by the determination so made. On the other hand, in this step 5, if the transmission ratio is determined to have reached the mode switching point, then proceed to step 6, where the low-speed clutch solenoid switch valve 33 is switched (or the energizing state thereof is put to ON) in order to disengage the low-speed clutch 7. Then, a speed change control according to the high-speed mode is started (or the transmission ratio of the toroidal continuously variable transmission 4 is regulated to a target transmission ratio according to the running state of the vehicle then in the high-speed mode) in conjunction with the start of switching the low-speed clutch solenoid switch valve 33. Then, return to start in FIG. 4 via end in FIG. 5 and end in FIG. 4.

On the other hand, in step I in FIG. 5, if it is determined that the current running mode is the high-speed mode (or the energizing state of the high-speed clutch solenoid switch valve 34 is currently ON and that pressure oil is introduced into the highs-speed clutch 8), then proceed to step 7, where the low-speed clutch solenoid switch valve 33 is switched (or the energizing state thereof is put to OFF) in order to engage the low-speed clutch 7. Even though the low-speed clutch solenoid switch valve 33 is switched in this way, the transmission ratio of the toroidal continuously variable transmission 4 continues to be regulated towards the optimal value for switching the mode (according to the target transmission ratio corresponding to the running state of the vehicle then) without being held at a value which resulted when the engagement of the low-speed clutch 7 was started. Following this, as in step 3 which was described previously, as is shown instep 8, a torque which passes through the toroidal continuously variable transmission 4 (a passage torque) is obtained. Namely, as in step 4 which was described previously, whether or not the differential pressure between both the hydraulic chambers 33a, 33b is 0 (or is within the range of 0±α) is determined in step 9. Then, if it is determined that the differential pressure has become 0 (of fallen within the range of 0±α) and that both the low-speed and high-speed clutches 7, 8 are engaged concurrently in step 9, then, as is shown in the following step 10, whether or not the current transmission ratio of the toroidal continuously variable transmission 4 has reached the mode switching point (the rotation synchronizing point, for example, a value corresponding to the point A in FIG. 3, 0.46 or less in the speed increasing ratio) If it is determined in step 10 like this that the transmission ratio has reached the mode switching point, then proceed to step 11, where the high-speed clutch solenoid switch valve 34 is switched (or the energizing state thereof is put to OFF) in order to disengage the high-speed clutch 8. Then, a speed change control according to the low-speed mode is started (or the transmission ratio of the toroidal continuously variable transmission 4 is regulated to a target transmission ratio according to the running state of the vehicle then in the low-speed mode) in conjunction with the start of switching the high-speed clutch solenoid switch valve 34. Then, return to start in FIG. 4 via end in FIG. 5 and end in FIG. 4.

On the other hand, in step 3 in FIG. 4, if it is determined that the reaching time T_MODE_CHG is longer than the delay time in response T_MODE_OIL (T_MODE_CHG<T_MODE_OIL), a mode switch stopping operation for maintaining the current mode is performed. Namely, since it can be determined from the current time delay in response T_MODE_OIL and reaching time T_MODE_CHG that the current transmission ratio of the toroidal continuously variable transmission has not yet reached, for example, the value corresponding to the point B in FIG. 3, then proceed to step 5 in FIG. 4, where a mode switch stopping operation for maintaining the current mode is performed. The mode switch stopping operation in FIG. 5 will be performed along a flowchart shown in FIG. 6. Namely, firstly, a determination of the current running mode is made (whether or not the low-speed mode is currently adopted is determined) in step 1 in FIG. 6. This determination is, as done in step 1 in FIG. 5, made based on the respective current operating states (the respective energizing states) of the low-speed clutch and high-speed clutch solenoid switch valves 33, 34. If it is determined in this step 1 that the current running mode is the low-speed mode (or the current energizing state of the low-speed clutch solenoid switch valve 33 is OFF and that pressure oil is currently introduced into the low-speed clutch 7), then proceed to step 2. In this step 2, the energizing state of the high-speed clutch solenoid switch valve 34 is kept OFF (or is put to OFF) to keep the high-speed clutch 8 disengaged or to disengage the high-speed clutch 8 if an engaging operation of the high-speed clutch 8 has already been started. Then, the process returns to start in FIG. 4 via end in FIG. 6 and end in FIG. 4.

Figure 6:
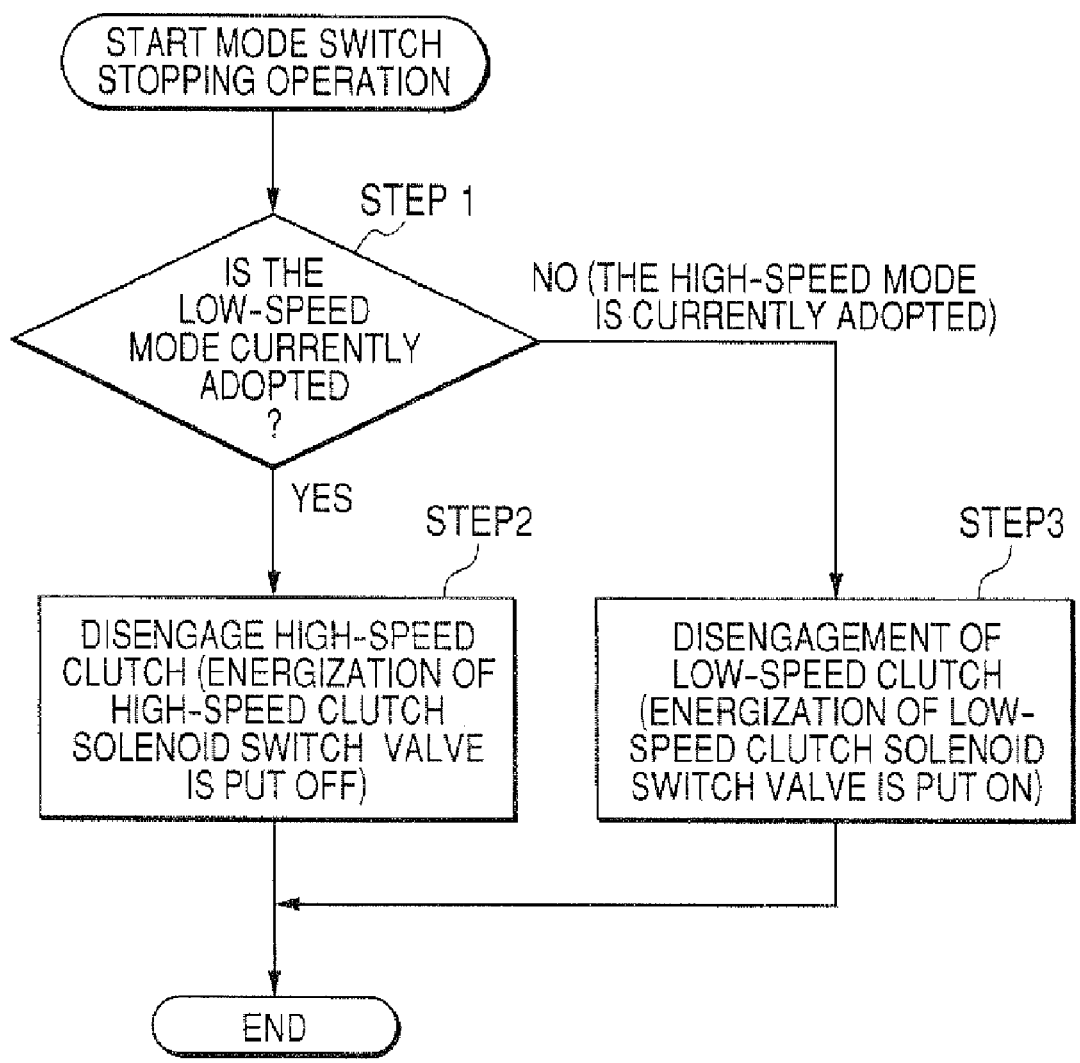
FIG. 6 is a flowchart of a mode switch stopping operation.

On the other hand, if it is determined in step 1 in FIG. 6 that the current running mode is the high-speed mode (or the current energizing state of the high-speed clutch solenoid switch valve 34 is ON and that pressure oil is currently introduced into the high-speed clutch 8), then proceed to step 3. In this step 3, the energizing state of the low-speed clutch solenoid switch valve 33 is kept ON (or put to ON) to keep the low-speed clutch 7 disengaged or to disengage the low-speed clutch 7 if an engaging operation of the low-speed clutch 7 has already been started. Then, the process returns to start in FIG. 4 via end in FIG. 6 and end in FIG. 4.

As has been described above, in the case of this embodiment, one of the clutches (for example, the high-speed clutch 8) which had been in disengagement until then is started according to the delay time in response of the one clutch before the transmission ratio of the toroidal continuously variable transmission 4 has reached the optimal value for switching the mode (for example, 0.46 in the speed increasing ratio). Because of this, the transmission ratio of the toroidal continuously variable transmission 4 can be regulated to the optimal value for switching the mode immediately before the one clutch has been engaged completely. As a result of this, a time period from the point in time at which the transmission ratio of the toroidal continuously variable transmission 4 has reached the optimal value for switching the mode in the way described above to the point in time at which a transmission ratio control according to the mode resulting after the mode switch (for example, the high-speed mode) is started can be made short, and a time period taken to complete the mode switch (a time period during which no speed change takes place in the toroidal continuously variable transmission 4, a time period taken to move from the point A to the point C in FIG. 3) can be made short. Because of this, for example, when the accelerator pedal is largely depressed (or the throttle position is increased) to drastically start (or drastically accelerate) the vehicle from rest and also when the vehicle is drastically accelerated based through a kickdown operation during the vehicle is running, the occurrence of a risk can be prevented that an intended acceleration by the driver is not obtained (or the acceleration performance is reduced).

In addition, in the case of this embodiment, the time (the timing) to start the engagement of the one clutch (for example, the high-speed clutch 8) is determined from the relationship between the delay time in response T_MODE_OIL and the reaching time T_MODE_CHG. On the other hand, although not shown, the engagement of the one clutch (for example, the high-speed clutch 8) can also be started according to the transmission ratio of the toroidal continuously variable transmission 4 then. Namely, the clutch switch valves with which oil pressure that is introduced into the respective low-speed and high-speed clutches 7, 8 can freely be regulated are used, and the oil pressure of the one clutch that is to be engaged in response to a change in the transmission ratio is increased, so that the oil pressure that is introduced into the hydraulic chambers of the clutch can be made to be a sufficient value to transmit power in such a state that the transmission ratio of the toroidal continuously variable transmission 4 has reached the optimal value for switching the mode (for example, the mode switching point). In this case, too, since the one clutch is allowed to be engaged completely at the point in time at which the transmission ratio of the toroidal continuously variable transmission 4 has the optical value for performance of the mode switch, the time period taken for the mode switch (the time period during which no seed change takes place in the toroidal continuously variable transmission 4) can be made short (or the transmission ratio control according to the mode resulting after the mode switch can be started quickly). In addition, when the configuration that has been described above is adopted, a determining operation of the engagement of the low-speed and high-speed clutches 7, 8 can also be omitted.

In addition, in the case of this embodiment, the concurrent engagement of the low-speed and high-speed clutches 7, 8 is determined based on the change in the torque (or the differential pressure corresponding thereto) which passes through the toroidal continuously variable transmission 4. Because of this, the disengagement of the other clutch 8 (or 7) which had been in engagement until then can be prevented irrespective of the fact that both the clutches 7, 8 are not engaged (or before the one clutch 7 (or 8) has not yet been engaged completely). In other words, the occurrence of a condition in which neither of the clutches 7, 8 is engaged completely (or no transmission of power is performed) is prevented so as to be able to prevent, for example, an abrupt increase in engine speed of an engine 1. In addition, on the contrary to this, a risk can also be prevented that a time period when both the clutches 7, 8 are kept engaged without disengagement of the other clutch 8 (or 7) irrespective of both the clutches 7, 8 being engaged is extended longer than necessary.

Note that the change in the torque which passes through the toroidal continuously variable transmission 4 (the passage torque) is obtained by the oil pressure sensors 36a, 36b which are conventionally placed for detecting the passage torque. Namely, the passage torque can be obtained as a change in the differential pressure between the pair of hydraulic chambers 35a, 35b of the hydraulic actuator 13 for displacing the support members (the trunnions) which support the power rollers 12 in the axial directions of the pivot shafts by the oil pressure sensors 36a, 36b which are provided in the pair of hydraulic chambers 35a, 35b, respectively. Because of this, there is no need to provide separately, for example, additional oil pressure sensors for detecting oil pressures in the hydraulic chambers of both the clutches 7, 8 in order to determine whether or not both the clutches 7, 8 are engaged concurrently, thereby making it possible to prevent the complexity in construction and increase in cost of the continuously variable transmission.

In addition, in the case of this embodiment, the engagement and disengagement of the respective low-speed clutch 7 and the high-speed clutch 8 are freely switched in an independent fashion based on the switch of the respective low-speed clutch and high-speed clutch solenoid switch valves 33, 34 which are controlled by the control unit 16. As a construction which switches independently the engagement and disengagement of the low-speed and high-speed clutches 7, 8 in the way described above, the oil pressure sent into the respective hydraulic chambers of the low-speed and high-speed clutches 7, 8 can be controlled by the low-speed clutch and high-speed clutch solenoid switch valves 33, 34, and in addition to this, the oil pressure can also be controlled by a solenoid proportioning valve or an actuator such as a motor. In addition, the engagement and disengagement of the low-speed and high-speed clutches can also be controlled directly by the actuator such as the motor or a switch valve. In short, either of the constructions can be adopted, provided that the engagement and disengagement of the low-speed and high-speed clutches 7, 8 can be switched independently. In addition, as has been described before, in the case of this embodiment, the low-speed clutch and high-speed clutch solenoid switch valves 33, 34 are brought into the de-energized state in realizing the low-speed mode. Because of this, even though there occurs a case where the energization of the respective solenoid switch valves 33, 34 cannot be implemented due to some failure, the running in the low-speed mode can be secured, a fail-safe system (an improvement in safety performance at the time of failure) being thereby realized.

In addition, in the case of this embodiment, the concurrent engagement of both the low-speed and high-speed clutches 7, 8 is determined based on the change in the torque which passes through the toroidal continuously variable transmission 4 (the passage torque). Then, this passage torque is detected as the differential pressure between the pair of hydraulic chambers 35a, 35b making up the actuator 13 by the conventionally placed oil pressure sensors 36a, 36b, that is, the oil pressure sensors 36a, 36b which are provided in the pair of hydraulic pressure chambers 35a, 35b, respectively. Although not shown, however, in the event that a loading cam type device is used as the loader, the change in the passage torque can also be detected based on a phase difference between cam surface formed members (for example, a cam plate and the input disk) which make up the loader. In addition, the change in the passage torque can also be detected by detecting a variation of a piston or the like which makes up the actuator 13 (for example, a variation of the piston in such a state that no speed change command is issued). As this occurs, however, there is a need to provide separately a displacement sensor. Because of this, from the viewpoint of cost reduction, it is preferable that an inexpensive sensor is used or the passage torque is detected from the differential pressure in the way described above.

In addition, the concurrent engagement of both the low-speed and high-speed clutches 7, 8 can also be detected from the displacement of respective pistons which make up these clutches. Additionally, the concurrent engagement of both the low-speed and high-speed clutches 7, 8 can also be detected from the displacement of a spool of a switch valve which switches the feeding state of pressure oil to the respective clutches 7, 8. In this case, too, however, there is a need to provide separately a displacement sensor. Because of this, from the viewpoint of cost reduction, it is preferable that the change in the passage torque is detected based on the change in the differential pressure in the way described above, so as to detect the concurrent engagement of both the clutches.

Thus, the invention has been described as being applied to the continuously variable transmission made up of the toroidal continuously variable transmission and the planetary gear transmission unit which are combined together and having the mode (the low-speed motor) which can realize the so-called geared neutral state in which the rotational state of the output shaft is switched between the forward rotation and the backward rotation across the stopped state interposed therebetween with the input shaft kept rotating in one direction. In addition, the invention can also be applied to a continuously variable transmission made up of a toroidal continuously variable transmission and a planetary gear transmission unit which are combined together and having a mode (a low-speed mode) in which power is transmitted only by the toroidal continuously variable transmission and a mode (a high-speed mode) which realizes a so-called power split state in which main power is transmitted only by the planetary gear transmission unit which is a differential unit, while the transmission ratio of the continuously variable transmission is regulated by the toroidal continuously variable transmission. In addition, the invention can also be applied not only as an automatic transmission for a motor vehicle but also as a transmission for various types of industrial machines. Additionally, as to the construction of the toroidal continuously variable transmission, either of a half toroidal type and a full toroidal type may be adopted.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A continuously variable transmission comprising:
   a toroidal continuously variable transmission;
   a planetary gear transmission; and
   a clutch device comprising:
      a low-speed clutch that is engaged to realize a low-speed mode in which a reduction ratio is increased and is disengaged to realize a high-speed mode in which the reduction ratio is decreased;
      a high-speed clutch that is engaged to realize the high-speed mode and is disengaged to realize the low-speed mode; and a control unit that switches an engagement/disengagement state of the low-speed clutch and the high-speed clutch so as to realize either of the low-speed mode and the high-speed mode, wherein when the mode of the clutch device is switched between the low-speed mode and the high-speed mode, in order to ensure a time period during which both the clutches are kept in engagement concurrently, after one of the low-speed and high-speed clutches which had been in disengagement until then is engaged, the control unit disengages the other of the clutches which had been in engagement until then, the control unit estimates a time delay in response which is considered to be necessary from a beginning to an end of the engagement of the one clutch, and when switching the speed mode, based on the thus pre-obtained delay time, the control unit starts to engage the one clutch before a transmission ratio of the toroidal continuously variable transmission has reached an optimal value for switching the mode of the clutch device.

2. The continuously variable transmission according to claim 1, wherein the control unit continues to adjust the transmission ratio of the toroidal continuously variable transmission to the optimal vale for switching the mode of the clutch device even though starting to engage the one clutch.

3. The continuously variable transmission according to claim 1, wherein the control unit estimates a reaching time, which is necessary for the transmission ratio of the toroidal continuously variable transmission to reach the optimal value for switching the mode of the clutch device from a current value, based on the current transmission ratio and a current change-speed of the toroidal continuously variable transmission, and the control unit starts to engage the one clutch on a condition that it is determined that the thus estimated reaching time becomes equal to or less than the time delay of the one clutch.

4. The continuously variable transmission according to claim 3, wherein when the clutch device is in the low-speed mode, the control unit starts to engage the high speed clutch on a condition that the estimated reaching time becomes equal to or less than the time delay of the high speed clutch.

5. The continuously variable transmission according to claim 3, wherein when the clutch device is in the high-speed mode, the control unit starts to engage the low speed clutch on a condition that the estimated reaching time becomes equal to or less than the time delay of the low speed clutch.

6. The continuously variable transmission according to claim 1, wherein the delay time in response is an estimated time period considered necessary for pressure of oil, which is introduced into the clutch, to rise to a sufficient pressure for performing power transmission from the control unit issuing a signal which instructs to engage the clutch, and the control unit adjusts the thus estimated delay time to a value corresponding to a current state quantity in accordance with the state quantity which affects the delay time in response.

7. The continuously variable transmission according to claim 1, wherein the control unit corrects a time point, at which the control unit starts engaging the one clutch, based on a current throttle position.

8. The continuously variable transmission according to claim 1, wherein the control unit judges whether both of the clutches are engaged concurrently based on a change of torque passing through the toroidal continuously variable transmission, and when switching the mode of the clutch device, the control unit disengages the other clutch which had been engaged until then.

9. The continuously variable transmission according to claim 8, wherein the control unit judges whether both of the clutches are connected based on whether or not the torque passing through the toroidal continuously variable transmission has become 0.

10. The continuously variable transmission according to claim 8, wherein the control unit judges whether both of the clutches are connected based on whether or not the passage torque has changed by a predetermined amount towards 0.

11. The continuously variable transmission according to claim 8, wherein the control unit judges whether both of the clutches are connected based on whether or not passage torque has changed at a predetermined speed towards 0.

12. The continuously variable transmission according to claim 8, wherein a geared neutral state, in which an output shaft is stopped while an input shaft is rotating in one direction, is achieved.

* * * * *